US006467503B2

United States Patent
Schlesch et al.

(10) Patent No.: US 6,467,503 B2
(45) Date of Patent: Oct. 22, 2002

(54) MANIFOLD AND STATION FOR MOUNTING STEAM/CONDENSATE RESPONSIVE DEVICES IN A CONDENSATE RETURN LINE

(75) Inventors: Ronald D. Schlesch; Steven O. Smith; Charles M. Reynolds, all of Three Rivers, MI (US)

(73) Assignee: Armstrong International, Inc., Three Rivers, MI ( * ) Notice: Subject to any disclaimer, the term of this patent is extended or adjusted under 35 U.S.C. 154(b) by 0 days.

(21) Appl. No.: 09/771,046

(22) Filed: Jan. 26, 2001

(65) Prior Publication Data
US 2002/0100509 A1 Aug. 1, 2002

Related U.S. Application Data

(63) Continuation-in-part of application No. 09/250,085, filed on Feb. 16, 1999, now abandoned, which is a continuation of application No. 08/870,231, filed on Jun. 6, 1997, now Pat. No. 5,881,766.

(51) Int. Cl.[7] .............................. F16K 11/20; F16T 1/38
(52) U.S. Cl. ....................................... 137/597; 137/549
(58) Field of Search ................................ 137/597, 594, 137/185, 549

(56) References Cited

U.S. PATENT DOCUMENTS

| 722,650 A | 3/1903 | Brainerd |
| 985,362 A | 2/1911 | McKeown |
| 2,954,798 A | 10/1960 | Mustee |
| 3,351,281 A | 11/1967 | Keil |
| 4,149,557 A | 4/1979 | Keech et al. |
| 4,287,908 A | 9/1981 | Storgard |
| 4,300,588 A | * 11/1981 | Fujiwara et al. ............ 137/185 |
| 4,508,135 A | 4/1985 | Schlesch et al. |
| 4,628,962 A | 12/1986 | Pezzarossi |
| 4,903,722 A | 2/1990 | Joseph et al. |
| 5,065,785 A | 11/1991 | Deacon et al. |
| 5,277,224 A | 1/1994 | Hutton et al. |
| 5,445,187 A | 8/1995 | Farquhar |
| 5,558,124 A | 9/1996 | Randall |
| 5,881,766 A | 3/1999 | Schlesch et al. |
| 5,947,145 A | 9/1999 | Schlesch et al. |

FOREIGN PATENT DOCUMENTS

| GB | 2251054 B | 12/1990 |
| GB | 2251286 A | 12/1991 |
| WO | WO98/36210 | 2/1998 |

OTHER PUBLICATIONS

"Piping Kings" *Plenty Steam Traps* brochure, published pre–Jun. 6, 1996 (8 sheets).
"Trouvay & Cauvin", *The Piston Valve*, brochure pp. 8–12, published pre–Jun. 6, 1996 (5 sheets).
"Trouvay & Cauvin", *PPC Compact Drain Manifold*, pp. 8–13 to 8–15, published pre–Jun. 6, 1996 (2 sheets).

* cited by examiner

Primary Examiner—Stephen Hepperle
(74) Attorney, Agent, or Firm—Flynn, Thiel, Boutell & Tanis, P.C.

(57) ABSTRACT

A station for mounting a steam/condensate responsive device in a condensate return line comprises a housing block having front and back faces, opposite end faces and top and bottom faces. The back face has a mount for removably mounting a steam/condensate responsive device. The end faces has inlet and outlet ports for connection in a condensate return line. The bottom face has a third port. An inlet valve and outlet valve are operatively interposed between and control flow between the mount and corresponding ones of the inlet and outlet ports. The inlet and outlet valves are located on and extending forward from the front face. The inlet and outlet valves are angled acutely upwardly along the front face. A compact manifold assembly mounts a plurality of such stations. A screen may be interposed between the inlet valve and mount to bar contaminant particles from the steam/condensate responsive device. A bleed port may be interposed between the inlet port and inlet valve to bleed off contaminants, resulting from work on the steam system upstream from the station, before opening the inlet valve.

44 Claims, 24 Drawing Sheets

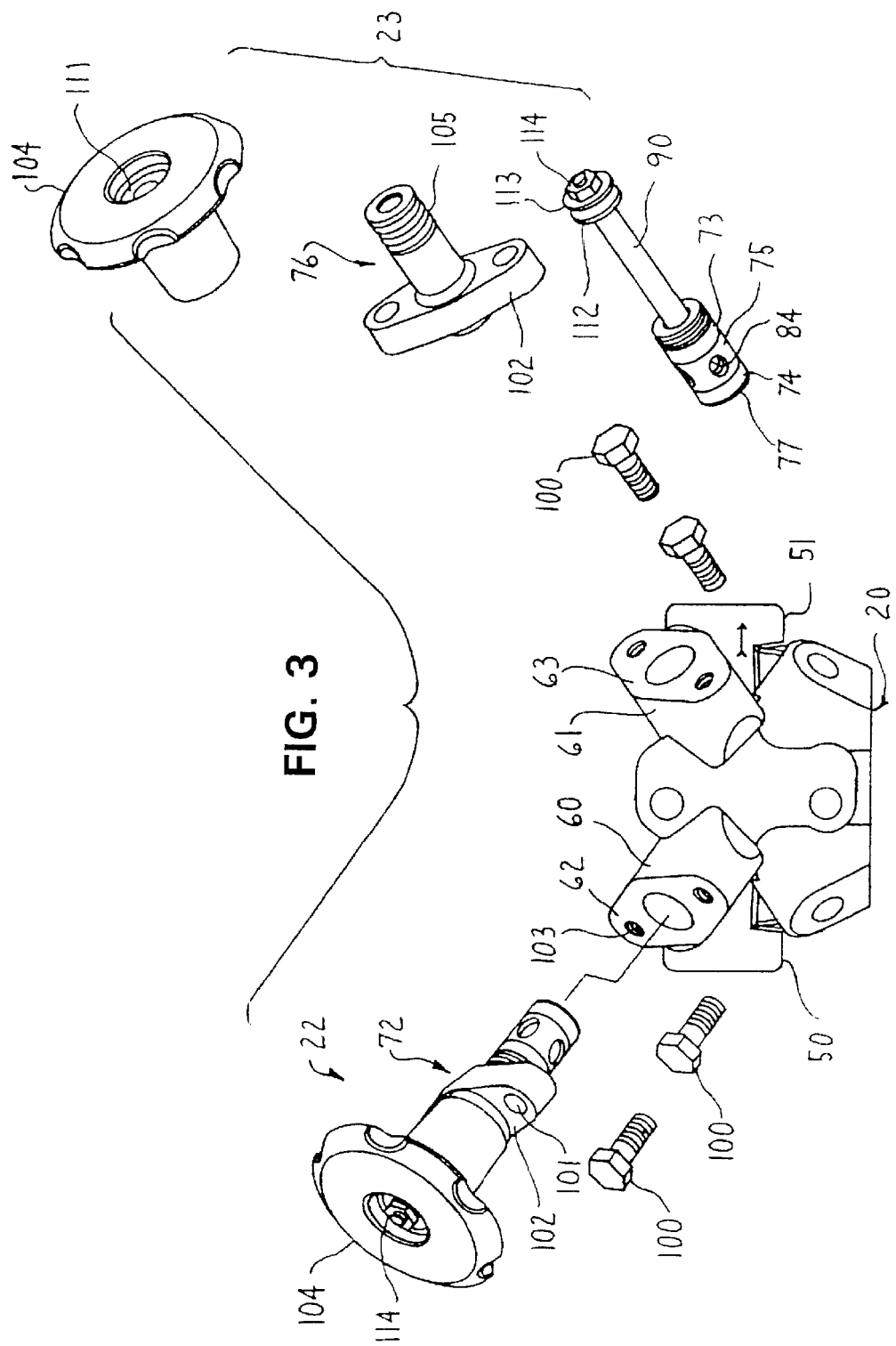

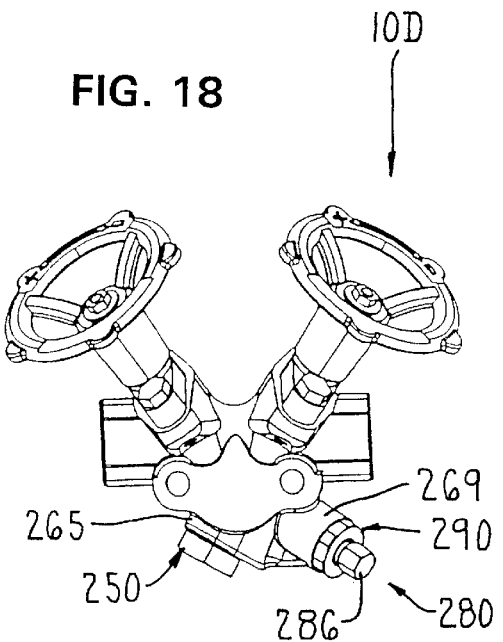
FIG. 18
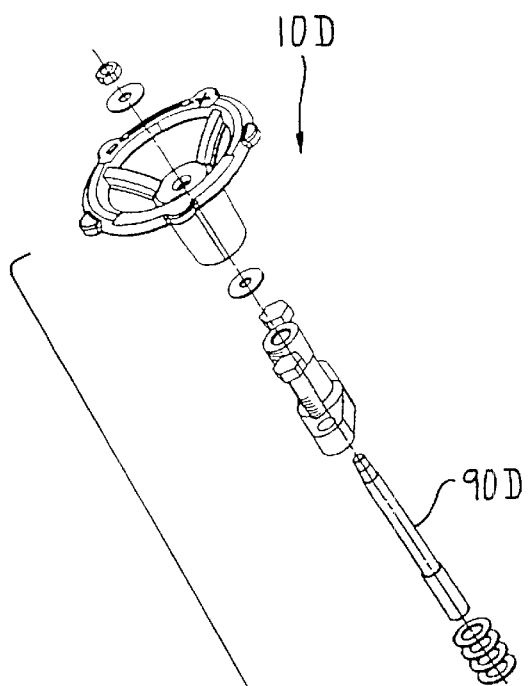
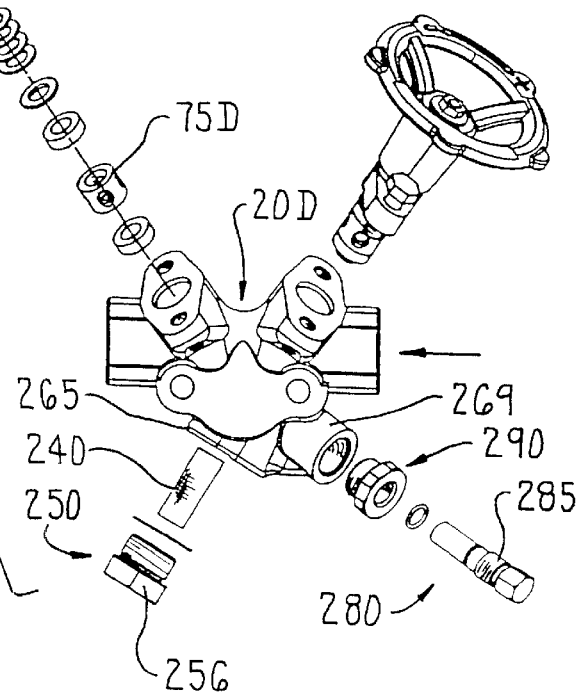
FIG. 19

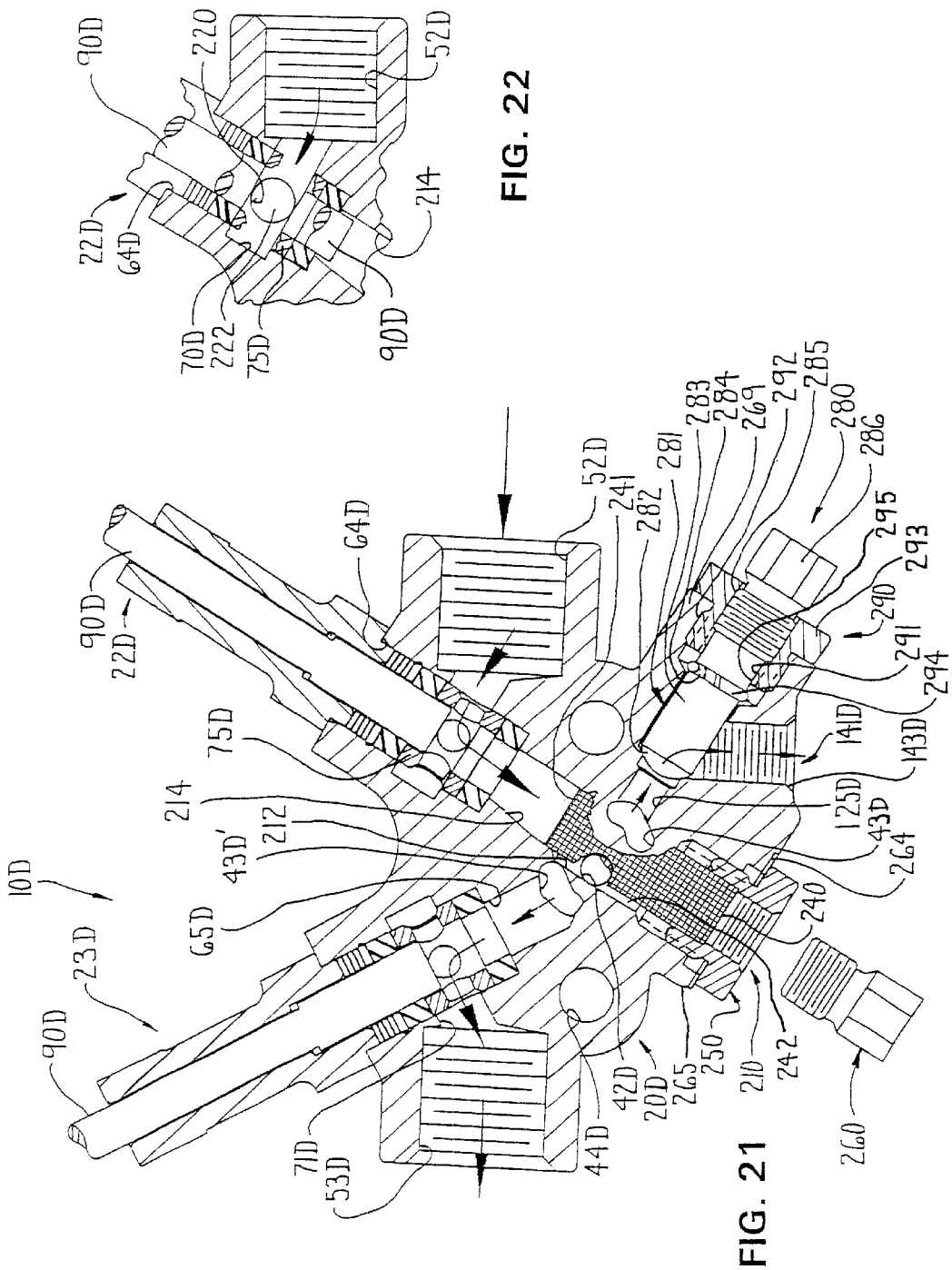

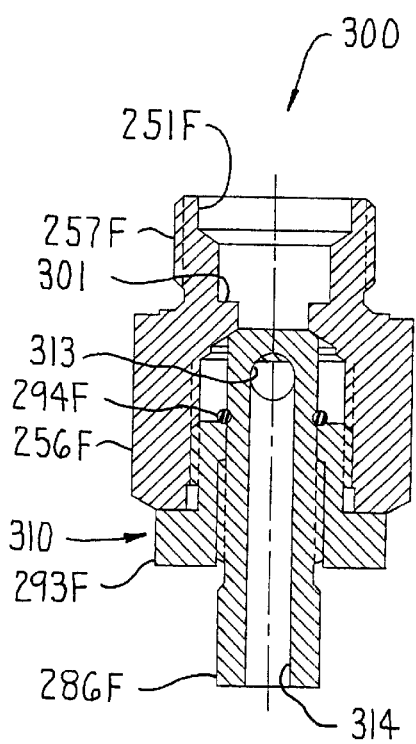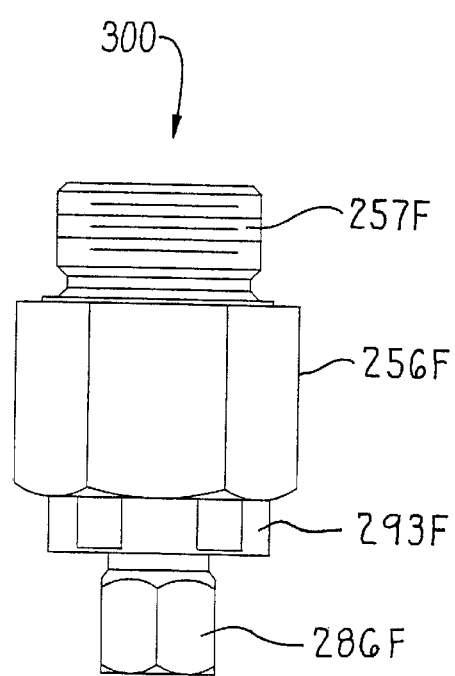
FIG. 37
FIG. 36

MANIFOLD AND STATION FOR MOUNTING STEAM/CONDENSATE RESPONSIVE DEVICES IN A CONDENSATE RETURN LINE

This application is a continuation-in-part of U.S. Ser. No. 09/250,085, filed Feb. 16, 1999 now abandoned, which is a continuation of U.S. Ser. No. 08/870,231, filed Jun. 6, 1997, now U.S. Pat. No. 5,881,766.

FIELD OF THE INVENTION

This invention relates to a station and manifold for mounting a steam/condensate responsive device, such as a steam trap, in a condensate return line and more particularly to a manifold for mounting a plurality of such stations for locating steam traps at a central location in a steam system.

BACKGROUND OF THE INVENTION

One form of steam/condensate responsive device for use in a condensate return line is the well known steam trap. An example is shown in U.S. Pat. No. 4,149,557 assigned to the Assignee of the present invention. Such a trap normally responds to the presence of condensate, and indeed is used to remove this condensate.

U.S. Pat. No. 4,508,135, assigned to the Assignee of the present invention, shows a steam trap with a combined inlet and outlet fitting incorporating an adjustable pivot connection, enabling the steam trap to be always mounted in its normal upright operating position in horizontal, vertical, or sloped condensate return lines. See for example the modified embodiment of FIGS. 3–7 in such patent.

The French company Trouvay & Cauvin, located at Fecamp, France, has marketed a drain manifold, incorporating stations for steam traps, under the series designation PPC, including models PPC1 and PPC2. A given station includes a forged housing block whose opposite ends walls have steam inlet and condensate outlet ports for connection to a condensate return line and drain manifold respectively, a back face for mounting a steam trap equipped with a fitting portion of the kind generally shown in abovementioned U.S. Pat. No. 4,508,135 at FIG. 7, a bottom face with drain and test ports and a front face carrying elongate inlet and outlet valves whose length axes converge rearwardly (i.e., in the general direction of the steam trap and housing block back wall).

However, the known PPC inlet and outlet ports and inlet and outlet valves substantially define a common midplane which, parallel to and spaced between the block top and bottom faces. Such common midplane is horizontal with the steam trap properly oriented for operation. A drain valve and/or a test valve depend from the bottom face of the housing block for condensate return line bleed or testing of the operation of the trap. These valves are external valves not housed in the station housing body and so require extra space below the housing body, thereby limiting the station stacking density in a multiple arm drain manifold.

While the Trouvay & Cauvin station above described has been generally satisfactory, the present applicant has noted the possibility of providing an even more compact station structure and thereby enabling greater compactness and packing density of the stations in a multi-station drain manifold. Such is particularly desirable in existing steam systems where, for convenience in maintenance or other reasons, one wants to concentrate the location of steam traps at a single, accessible location without substantial relocation of other steam system components to make the required space.

Applicant has further noted the possibility of providing greater protection against damage to, and operating accessibility for, bleed and test valves, by locating them internally in the housing block and has further noted that this can be done without significant, if any, increase in housing block size.

Accordingly, it is an object and purpose of the present invention to provide improvements, including one or more of those above stated, in manifold/station systems of this general kind.

Other objects and purposes of the invention will be apparent to persons familiar with apparatus of this general kind upon reading the following description and inspecting the company drawings.

SUMMARY OF THE INVENTION

In one aspect, this invention relates to the station for mounting a steam/condensate responsive device in the condensate return line wherein elongate valve members acutely angle from the front face of a housing block, with respect to a plane through the front, back and end faces of the block, i.e., angle acutely with respect to a plane parallel to the top and bottom faces of the housing block.

In another aspect of the invention, there is provided a compact multi-station manifold assembly for mounting plural steam/condensate responsive devices in a steam system and wherein valves angle from the front face of the station block, and with respect to a plane parallel to the top and bottom faces of the housing block.

In another aspect of the invention, contaminant particles in incoming steam are screened out before reaching a steam/condensate responsive device.

BRIEF DESCRIPTION OF THE DRAWINGS

FIG. 3 is an exploded view, taken from the front, of a station like that of FIG. 1 but mirror imaged for left to right flow.

FIG. 18 is a view similar to FIG. 1 but showing a modification.

FIG. 19 is a view similar to FIG. 18 but exploded.

FIG. 21 is a schematic cross sectional view generally similar to FIG. 4 but based on the FIG. 18 modification.

FIG. 22 is a fragment of 21 with the inlet valve broken away to show the inlet bleed opening.

FIG. 36 is an enlarged, assembled elevational view of the modified screen retainer of FIG. 35.

FIG. 37 is a central cross sectional view of the FIG. 36 retainer.

DETAILED DESCRIPTION

Figure 2:
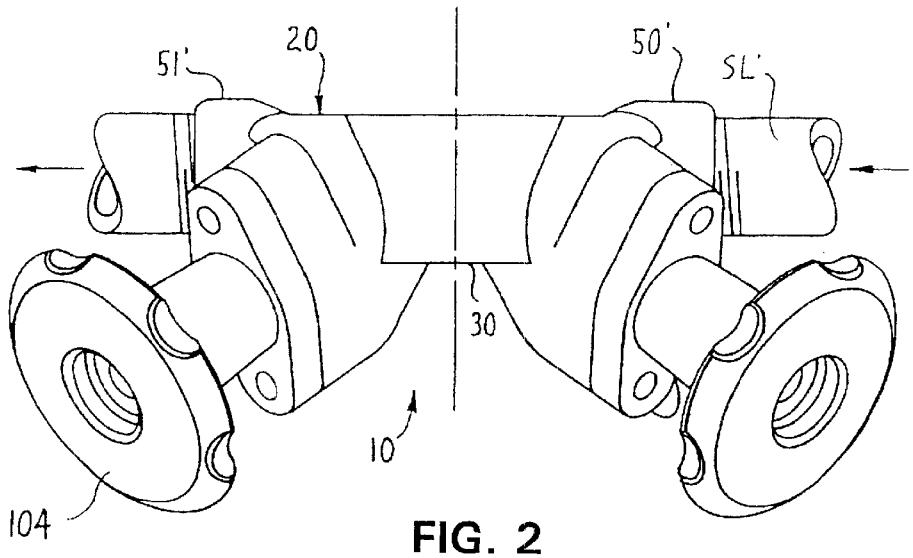
FIG. 2 is a top view of the FIG. 1 station.
Figure 1:
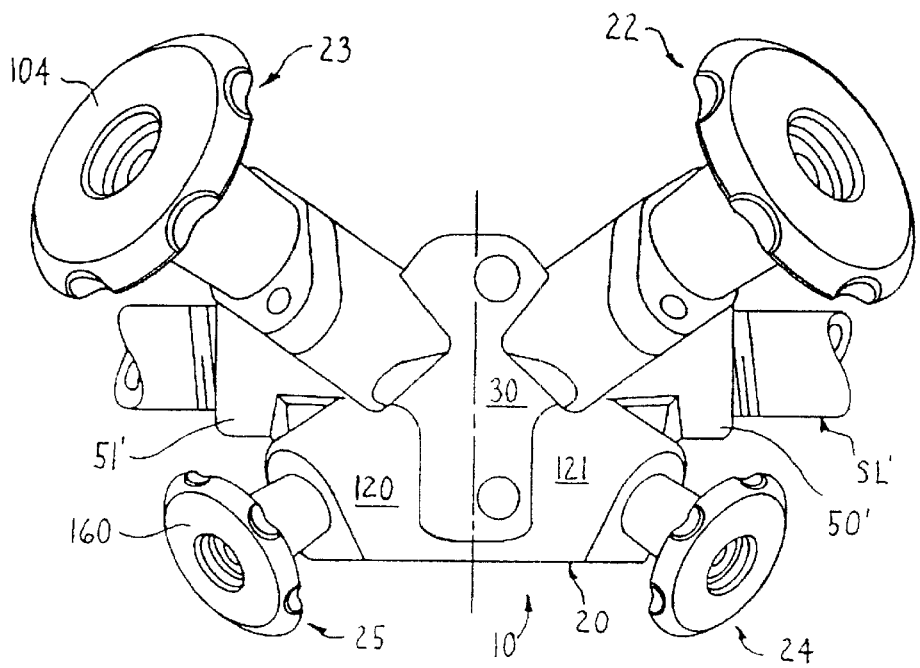
FIG. 1 is a front view of a right to left flow station embodying the invention.
Figure 15:
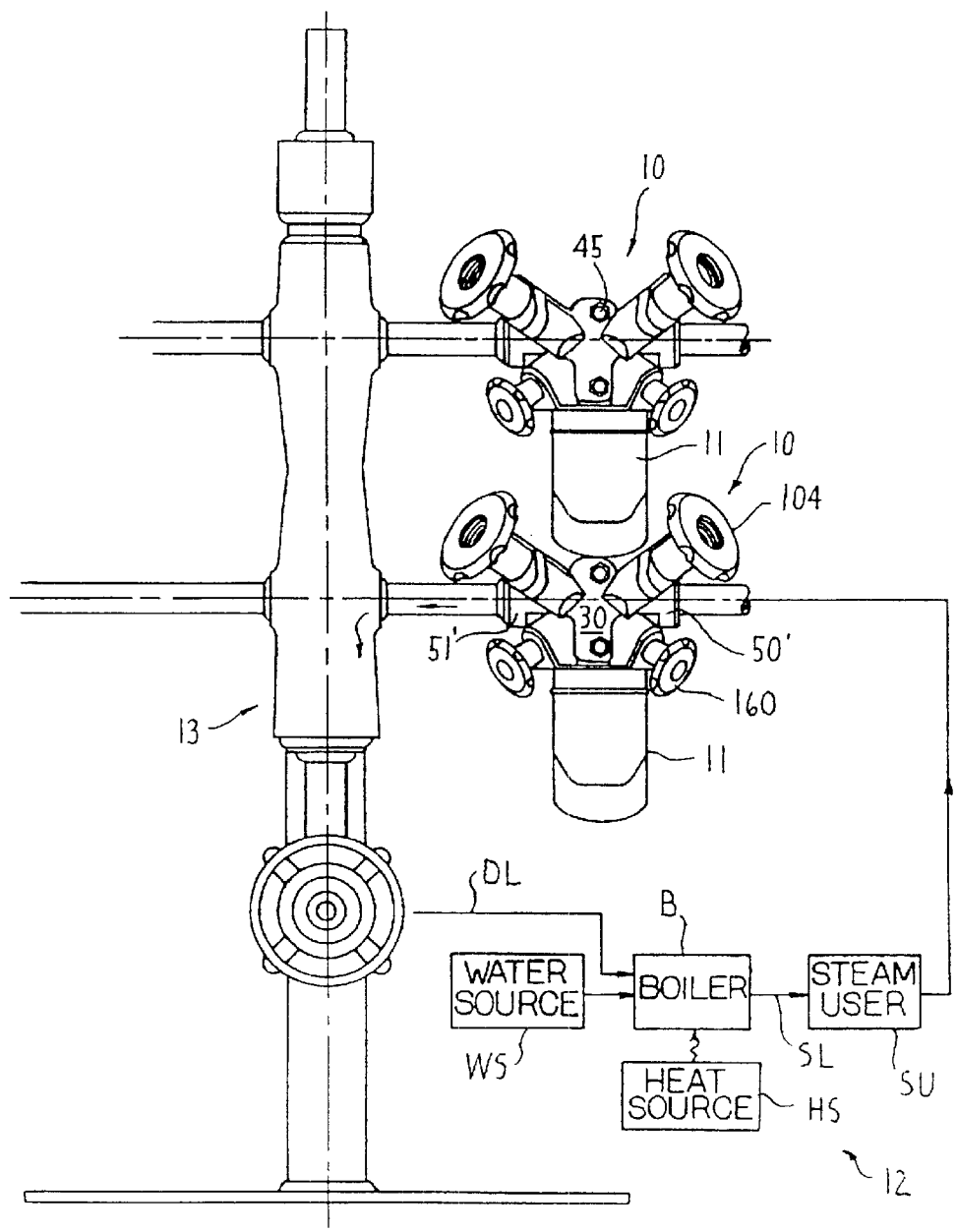
FIG. 15 is a front view of a manifold for mounting stations of the kind shown in FIGS. 1 and 3.

FIGS. 1 and 2 disclose a station 10 for mounting a steam/condensate responsive device, for example a steam trap 11 (FIG. 15) in a steam system schematically indicated at 12 in FIG. 15. Such a steam system may have a variety of conventional configurations but, in the schematic system 12 in FIG. 15, comprises a boiler B, furnished water from a water source WS and heated by heat source HS for producing steam in a condensate return line SL connected to a steam utilization device SU of any designed type (e.g. space heater, engine, etc.) which extracts heat energy from the steam. Resultant heat energy depleted fluid (steam and condensate) is applied through a line SL' to a steam trap 11, which returns condensate through a drain manifold 13 and a drain line DL to the boiler B.

Figure 5:
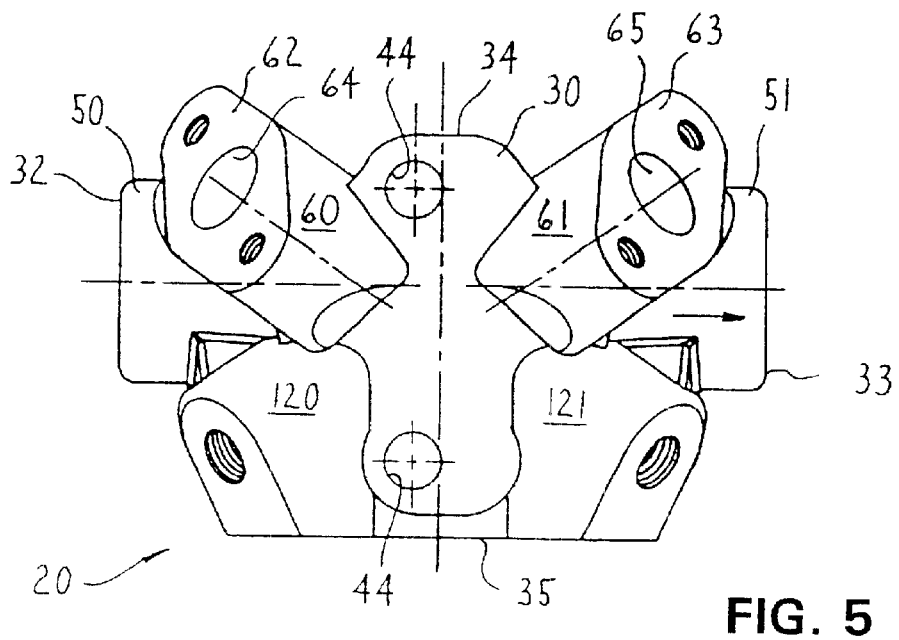
FIG. 5 is a front view of the block of FIG. 3.
Figure 8:
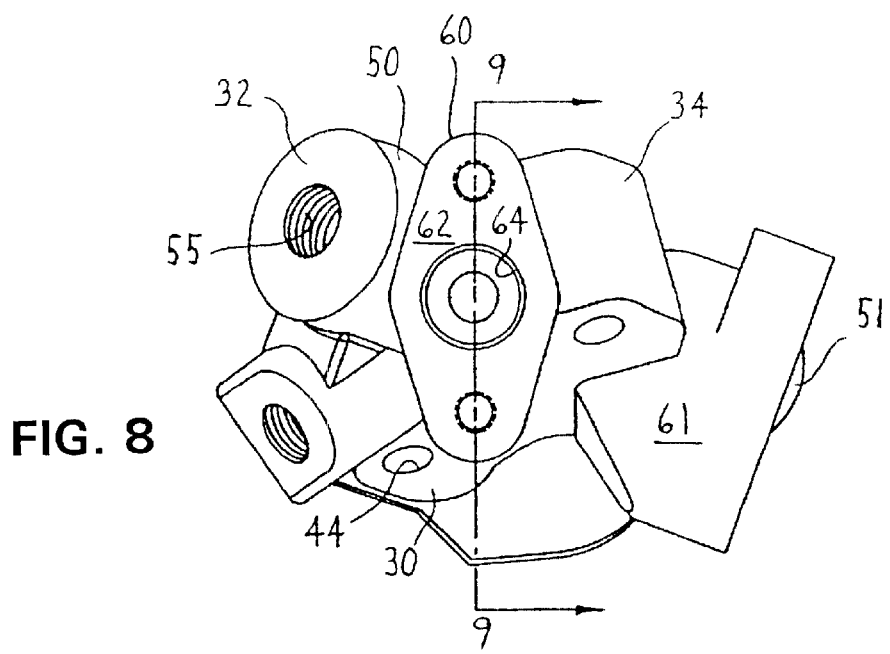
FIG. 8 is a view of the FIG. 5 block taken along the length axis of the inlet valve 4.

Turning in more detail to the station 10 (FIGS. 1 and 2), same comprises a housing block 20 having a front face 30 from which forwardly divergently angle, in a porcupine-like manner, knobs of an inlet valve 22 and outlet valve 23 and, optionally, a bleed valve 24 and/or a test valve 25. The housing block 20 (FIGS. 5–13) comprises the front face 30, a back face 31, left and right (as seen from the front in FIG. 5) end faces 32 and 33, a top face 34 and a bottom face 35. The back face 31 has a mount, generally indicated at 40 (FIG. 7), for removably mounting a steam/condensate responsive device, such as a steam trap 11 (FIG. 15).

Figure 7:
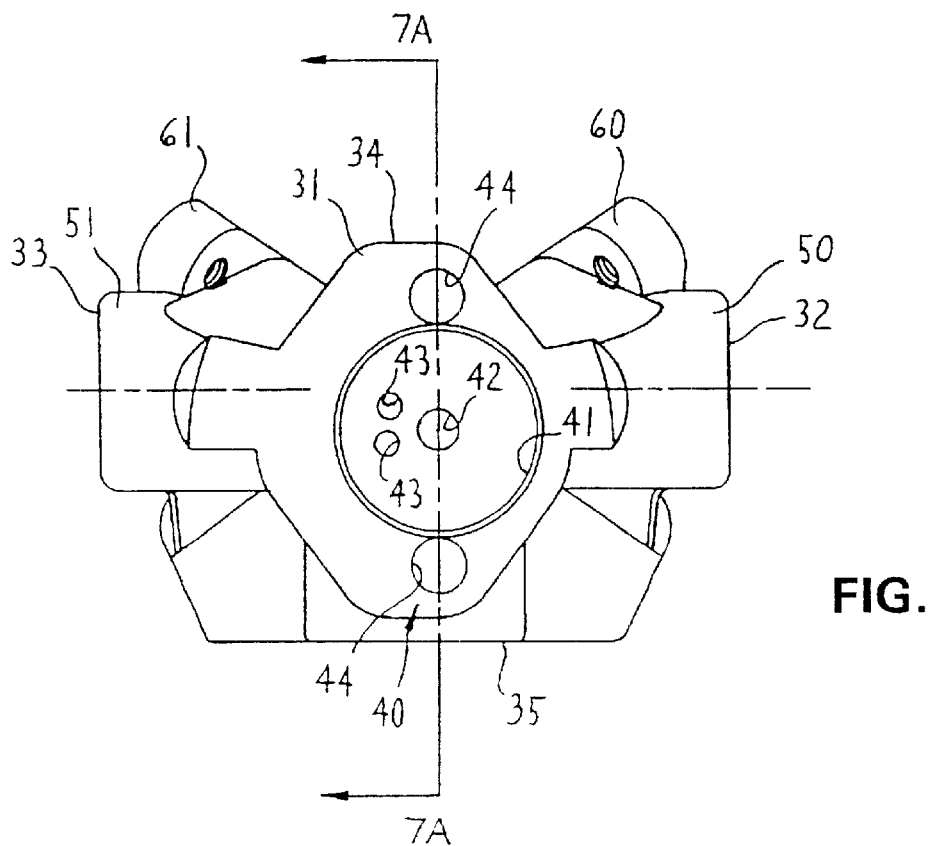
FIG. 7 is a rear view of the FIG. 5 block.
Figure 14:
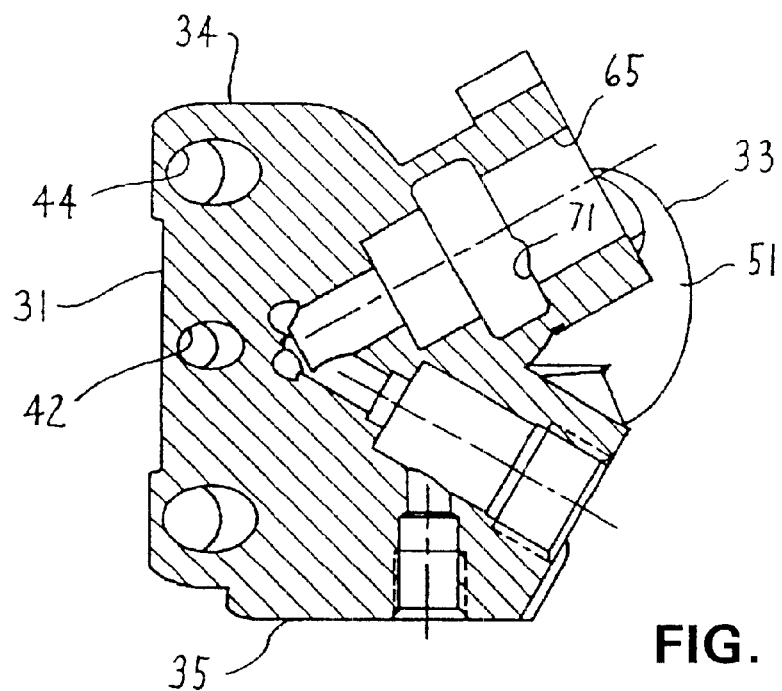
FIG. 14 is a sectional view taken on the line 14—14 of FIG. 10.
Figure 7A:
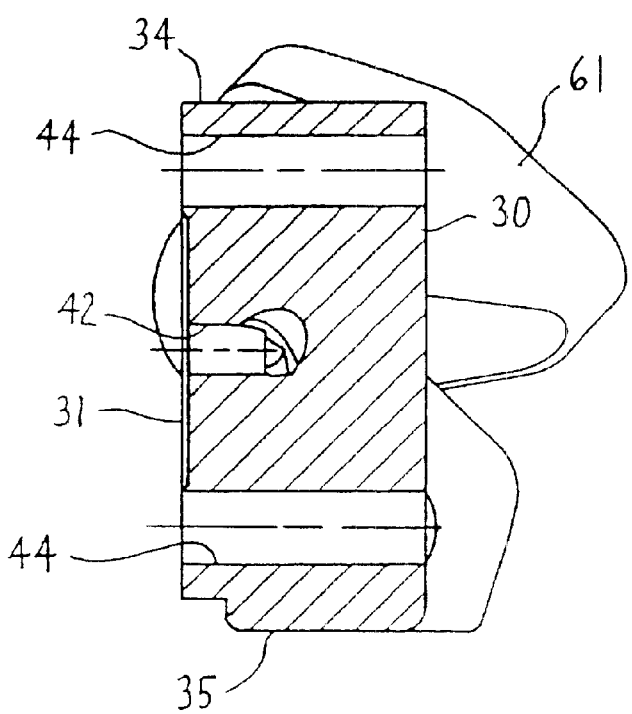
FIG. 7A is a sectional view substantially taken on the line 7A—7A of FIG. 7.
Figure 11:
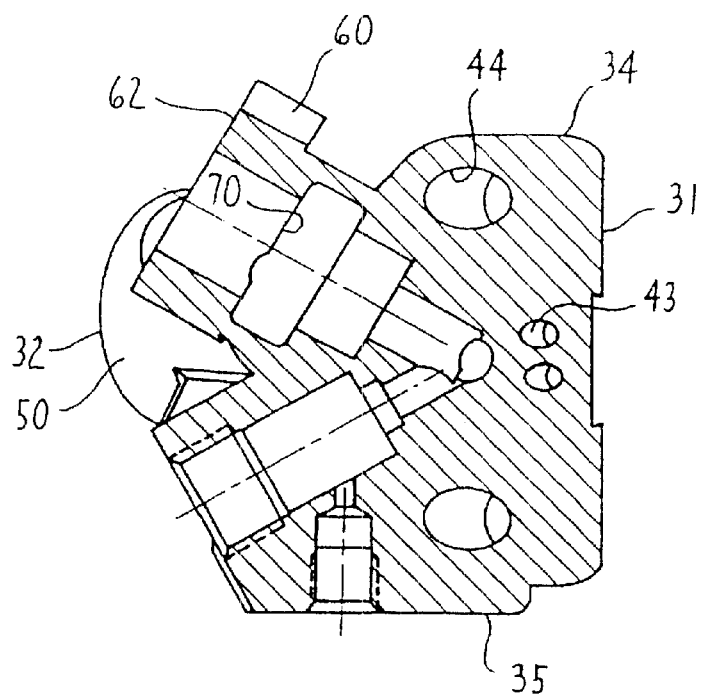
FIG. 11 is a sectional view substantially taken on the line 11—11 of FIG. 10.
Figure 9:
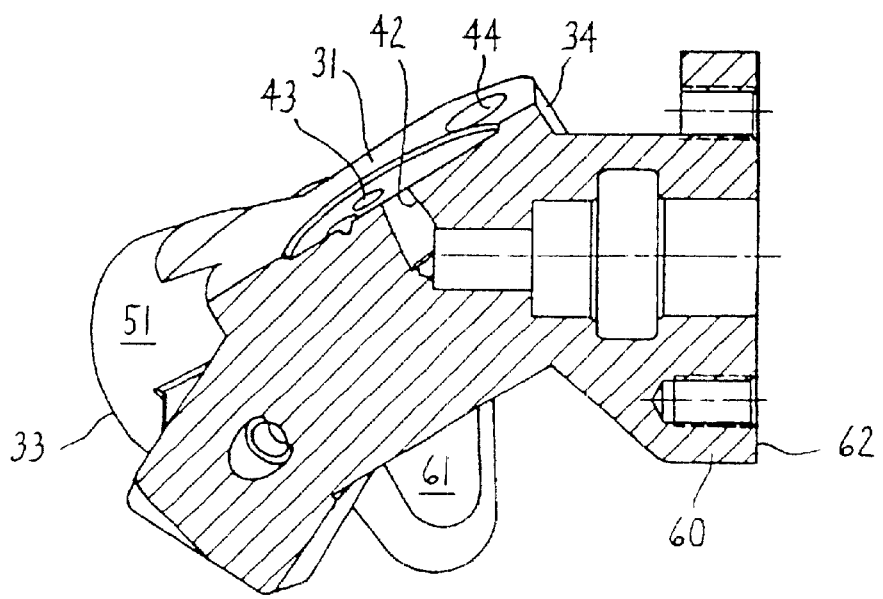
FIG. 9 is a sectional view taken on the line 9—9 of FIG. 8.
Figure 10:
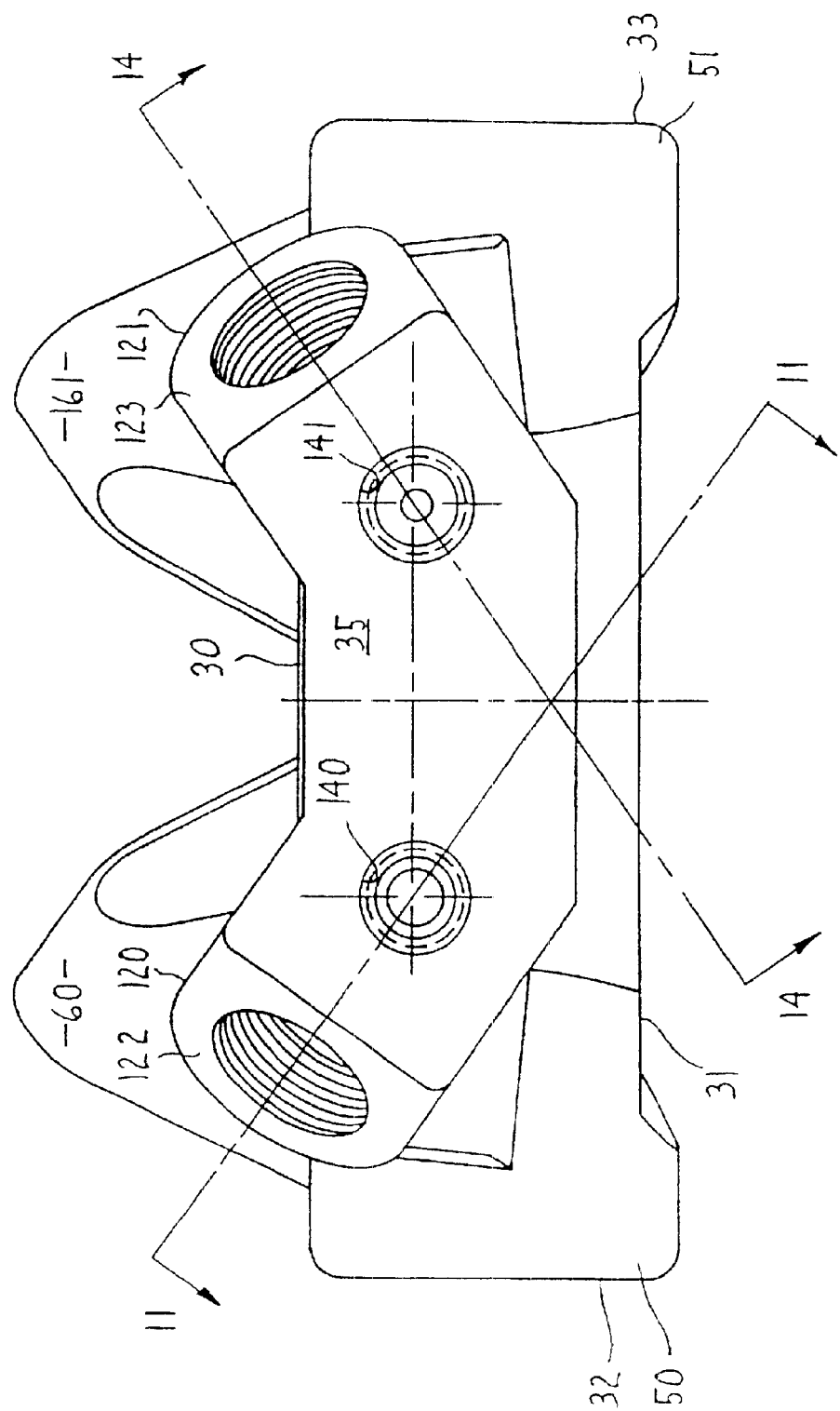
FIG. 10 is a bottom view of the FIG. 5 block.
Figure 13:
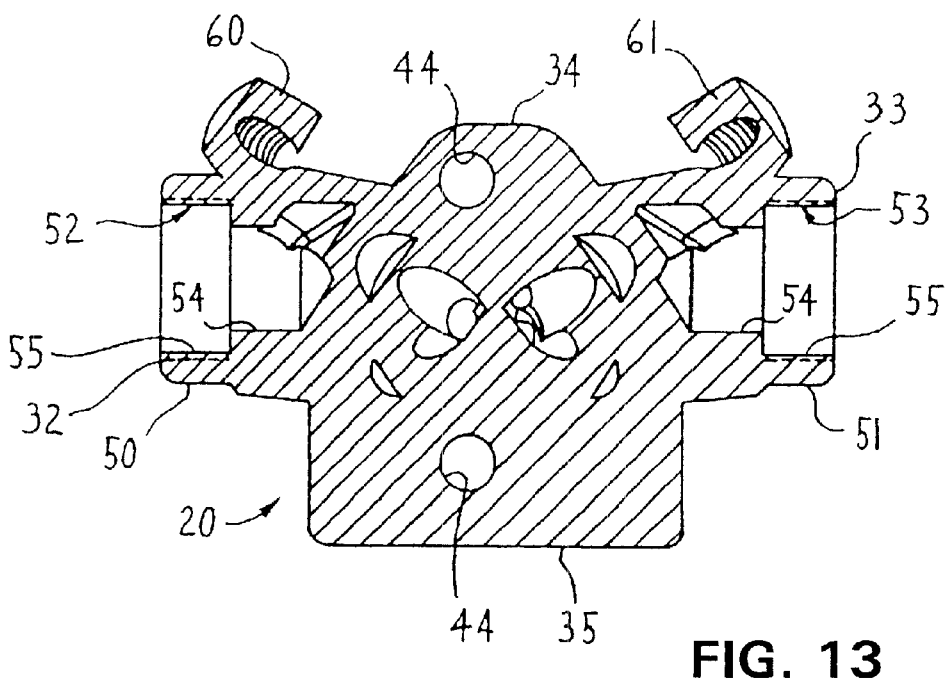
FIG. 13 is a sectional view taken on the line 13—13 of FIG. 12.
Figure 12:
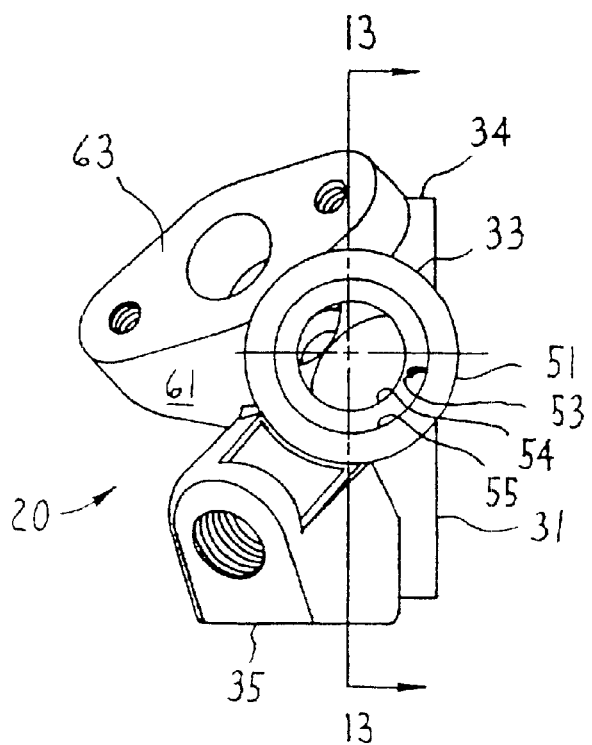
FIG. 12 is an elevational view taken from the right end of the FIG. 5 block.

Mount 40 (FIG. 7) comprises a shallow circular recess 41 in a central portion of the back face 31. In the embodiment shown, the recess 41 is offset slightly laterally off center in FIG. 1. A trap supply opening 42 is centered in the recess 41 and opens rearward therefrom. A pair of trap condensate forwarding openings 43 open rearwardly from the recess 41 and are spaced eccentrically between the opening 42 and the perimeter of the recess 41. The openings 43 preferably are circumferentially close as seen in FIG. 7. The openings 43 are at the same radial distance from the center of opening 42.

Mounting holes 44 are located immediately above and below the recess 41 on a vertical diametral plane of the recess 41 and central opening 42. The mounting holes 44 extend through the thickness of the housing block 20 and thus open through the front face 30 (FIG. 5) thereof.

Figure 6:
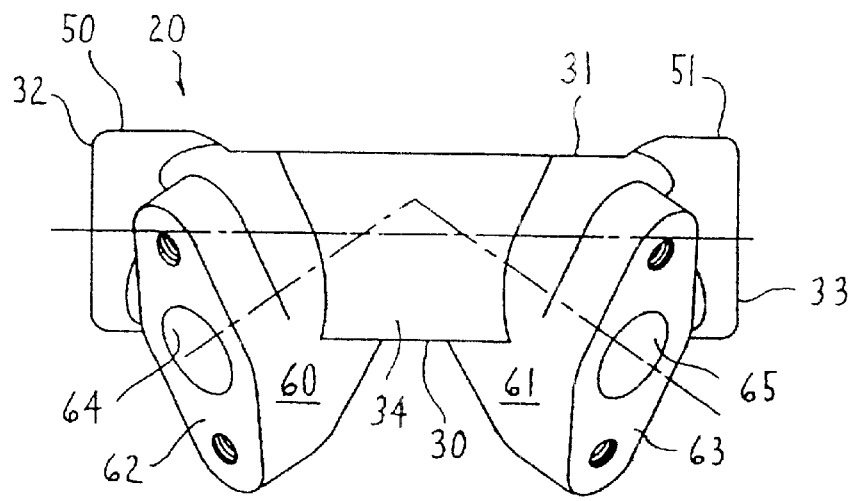
FIG. 6 is a top view of the FIG. 5 block.

While the mount 40 may be configured for use with other steam system devices, in the embodiment shown, it is, to the extent above described, configured similar to the coupling 71A of FIG. 6 of the aforementioned U.S. Pat. No. 4,508,135, assigned to the Assignee of the present invention, for mounting a steam trap providing with a coupling like that at 111 in FIG. 7 of aforementioned U.S. Pat. No. 4,508,135. While such coupling 111 may be used to carry a variety of steam system devices, a particular example would be a steam trap such as that illustrated in aforementioned U.S. Pat. No. 4,508,135 at FIG. 7, or as more fully disclosed in U.S. Pat. No. 4,149,557 also assigned to the Assignee of the invention. Such a steam trap is, by way of example, shown at 11 in FIGS. 15 and 16 of the enclosed drawings and provided with a collar of the aforementioned type, indicated at C in FIG. 16.

Figure 17:
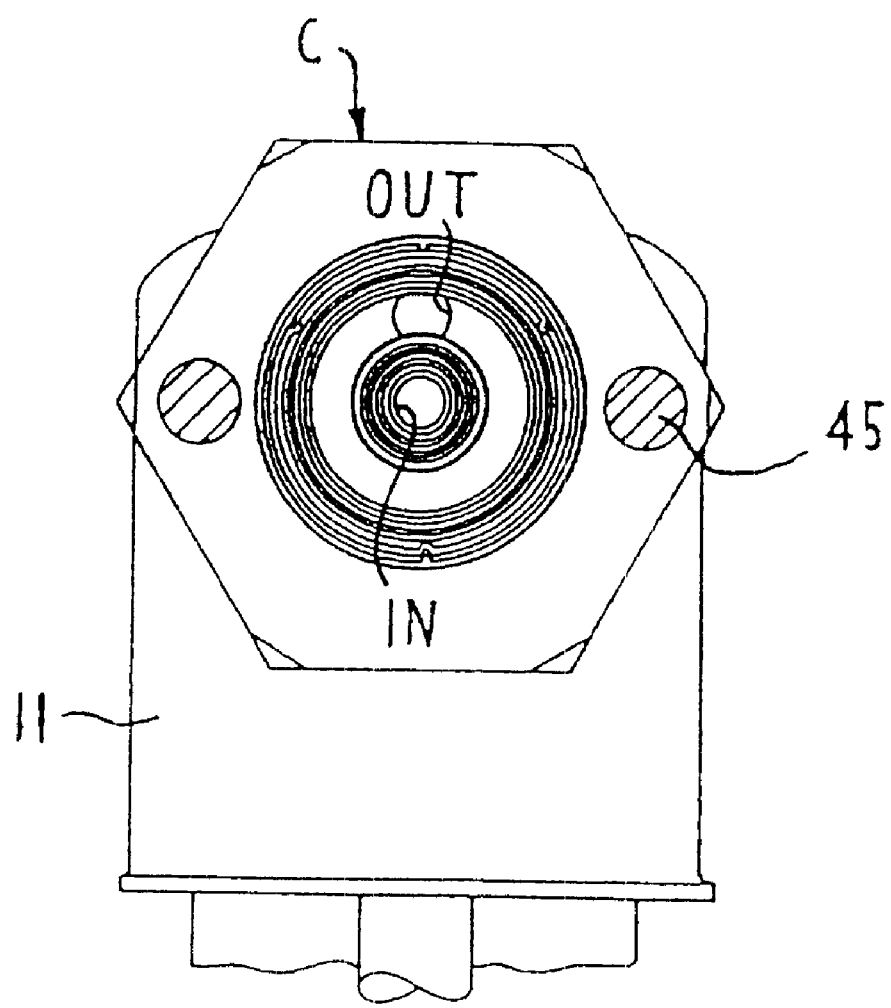
FIG. 17 is a fragmentary front view of a steam trap having a coupling adapted to be fixed on the station of FIG. 1 or 3.

For convenient reference, the front face of such collar C a fragment of a steam trap 11 carried thereby, are shown herewith in FIG. 17, which FIG. 17 corresponds in structure to aforementioned FIG. 7 of aforementioned U.S. Pat. No. 4,508,135.

Machine screws 45 (FIG. 17) pass rearward through the mounting holes 44 in the housing body 20 and thread into the collar C to fixedly support the steam trap 111 on the rear face of the housing body 20. By loosening the screws 45, the housing body 20 can be rotated, about the axis of center opening 42, while leaving the steam trap 111 upright for proper operation. This allows the housing block 20 to be placed in a piping system in different angular orientations (i.e., rotated clockwise or counterclockwise from its FIG. 1 position beyond 360°) while still leaving the associated steam trap upright.

The block 20 (FIGS. 5, 12 and 13) includes coaxial, substantially cylindrical, leftwardly and rightwardly extending bosses 50 and 51 whose ends carry the end faces 32 and 33. The bosses 50 and 51 (FIG. 13) have respective coaxial ports 52 and 53 coaxially opening therefrom. Preferably, each of the ports 52 and 53 comprises a hole 54 whose outer end is an enlarged diameter, coaxial, outward opening recess 55. The recesses 55, in the preferred embodiment shown, are threaded internally (as indicated by the dotted lines in FIG. 13) for connection to conventional pipes constituting part of the piping associated with a steam system like that generally indicated in FIG. 15.

As will be apparent from the drawings, the embodiment of the block 20 shown in FIGS. 3–14 is, when seen from the front (as in FIG. 3) arranged for flow from left to right, the inlet boss 50 being on the left, and the outlet boss 51 being on the right. However, this is a modification, in left to right (in FIGS. 1 and 3) for purposes of adaptation to a condensate return line of reverse flow direction, of the embodiment shown in FIGS. 1, 2, 15 and 16. For convenience in reference, the right to left flow station (shown in FIGS. 1, 2, 15 and 16) has its inlet boss indicated at 50' and its outlet boss indicated at 51'. Again, it will be understood that the FIG. 1, 2, 15 and 16 embodiment is identical to that of FIGS. 3–14 except for the mirror imaging horizontally (as seen from the front in FIGS. 1 and 3 for example) to accommodate condensate return line flow in opposite directions in the corresponding condensate return line.

The housing block 20 (FIGS. 5 and 6) further includes inlet and outlet valve bosses 60 and 61 having respective generally diamond shaped, somewhat rounded, end faces 62 and 63. Inlet and outlet valve bores 64 and 65 (FIGS. 5 and 6) extend, preferably in substantially centered and perpendicular relationship, through the end faces 62 and 63, respectively, of the inlet and outlet valve bosses 60 and 61. As seen schematically in FIG. 4, the inlet and outlet valve bores 64 and 65 extend convergently into the housing block 20 sufficient to respectively intersect the center opening 42 and eccentric openings 43. The inlet and outlet valve bores 64 and 65 extend through the radially enlarged inlet and outlet chambers 70 and 71, respectively. The chambers 70 and 71 are formed within the block 20 and extend radially outward into communication with the inlet and outlet ports 52 and 53, respectively, so as to communicate the latter with the center opening 42 and eccentric openings 43, respectively.

Figure 4:
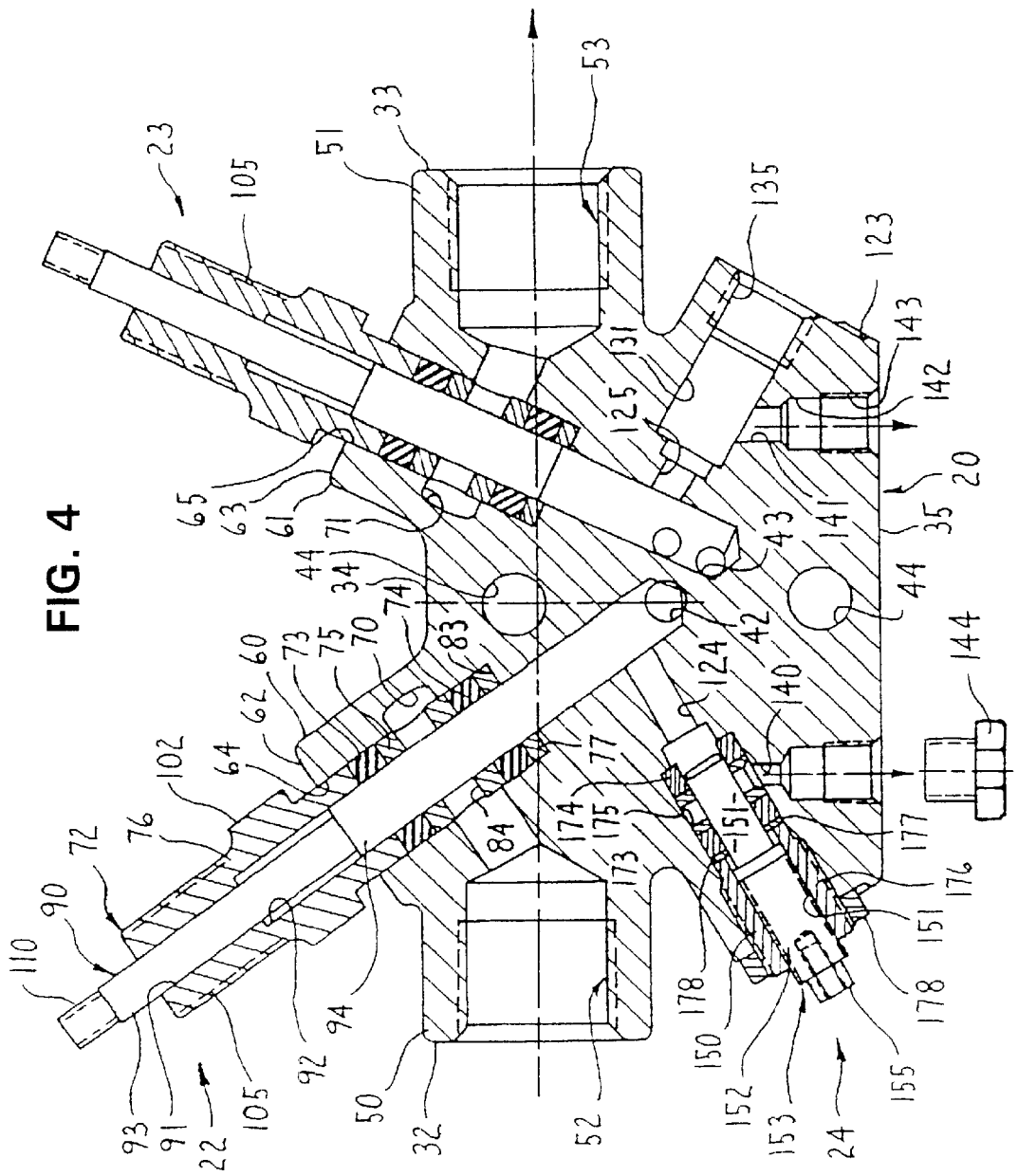
FIG. 4 is a schematic cross sectional view based on the FIG. 3 station, the schematizing including in effect pivoting the forward angled FIG. 3 valve axes rearwardly into a common plane and rearward shifting of the bleed and testports into that common plane, changing angular relationships between ports and valves, and changing other dimensional relationships to provide a clear view of flow paths through the station block.

The inlet and outlet valves 22 and 23 are preferably identical and may be of any convenient type capable of turning on and off and controlling rate of flow. As schematically indicated in FIG. 4, the inlet valve 22 controls flow from the inlet port 52 through the inlet chamber 70 and inlet valve bore 64 to the center opening 42 and thence to the steam trap 11 (FIG. 15). On the other hand, the outlet valve 23 controls flow from the steam trap 11 through the eccentric openings 43 (as schematically indicated in FIG. 4) through the inner part of the outlet valve bore 65, outlet chamber 71 and outlet port 53. The inlet and outlet valves 22 and 23 are conveniently identical, may be conventional, and in the embodiment shown are generally of a type used in the prior art model PPC Compact Drain Manifold manufactured by Trouvay & Cauvin of Fecamp, France. Similar inlet and outlet valves are also disclosed in U.S. application Ser. No. 08/870,229 filed Jun. 6, 1997 now U.S. Pat. No. 5,947,145 assigned to the Assignee of the present invention, to which reference may be made.

Thus, in the embodiment schematically shown in FIG. 4, the valves 22 and 23 each comprise a hollow tubular valve sleeve 72. The sleeve 72 has an inner portion snugly but slidably received in a cylindrical outer recessed portion of the corresponding valve bore 64 or 65 and which includes outer and inner annular seals 73 and 74 coaxially flanking a radially ported flow collar 75 and in turn coaxially flanked by an outer elongate portion (or bonnet) 76 of the valve sleeve 72 and an inner end ring 77. When installed in the block 20, as schematically indicated in FIG. 4, the inner end ring 77 bottoms on an axially outwardly facing step 83 in the corresponding valve bore 64, 65. The annular seals 73 and 74 are located axially outboard and inboard, respectively, of the inlet or outlet chamber 70 or 71 and the flow collar 75 extends axially through the inlet or outlet chamber 70 or 71, such that radial ports 84 therein communicate the interior end of the corresponding inlet or outlet valve bore 64 or 65 with the corresponding inlet or outlet chamber 70 or 71.

The inlet and outlet valves 22 and 23, as schematically indicated in FIG. 4, each further include an elongate valve stem 90 coaxially slidably snugly guided in the corresponding valve sleeve 72 to open and close flow through the radial ports 84. The valve sleeve 72 has a coaxial bore 91 opening axially outwardly away from the block 20 and an elongate, coaxial enlarged diameter, recess 92 extending axially inward therefrom through the elements 73–75 and 77. The valve stem 90 correspondingly comprises an axially outer actuating rod 93 snugly and slidably guided in the outer bore 91 and an enlarged diameter, elongate, generally cylindrical, valve plunger 94 extending coaxially inboard fixedly from the rod 93 and snugly, sealingly, axially slidable through the parts 73–75 and 77 of the valve sleeve 72, as schematically indicated in FIG. 4 in the closed position of the valves 22 and 23. Thus, in this closed position, the valve plunger 94 blocks the ports 84 and seals with respect to the inner annular seal 74 to positively block flow through the corresponding valve 22 or 23. The recess 92 extends axially outward from the valve plunger 94, in the closed position of the latter shown schematically in FIG. 4, to allow axially outward movement of the valve stem 90 sufficient to axially outwardly withdraw the valve plunger 90 to clear the seal 74 and ports 84, and thereby open flow through the corresponding valve 22 or 23, i.e. open flow from the inlet port 52 to the center opening 42 or from the eccentric openings 43 to the outlet port 53.

To fix the valve sleeve 72 to the block 20, screws 100 extend through holes 101 in rounded, substantially diamond-shaped, radial flanges 102 on the portion of the valve sleeve 72 outside and adjacent the block 20. The screws 100 threadedly engage threaded openings 103 flanking the valve inlet or outlet bore 64 or 65 in the opposed end face 62 or 63 of the corresponding inlet or outlet valve boss 60 or 61.

The inlet and outlet valves 22 and 23 here shown each further include a manually rotatable knob 104 (FIG. 3). The knob 104 is hollow and has internal threads (not shown) threaded on external threads 105 (FIG. 4) on the bonnet 76 for threaded axial in and out movement of the knob on the exposed outer end of the valve sleeve 72, toward and away from the block 20. The outer end portion 110 of the valve stem 90 is radially inwardly stepped and threaded to receive thereon a radially inwardly directed flange 111 (FIG. 3) of the knob 104. A nut 114 (FIG. 3) threads on the threaded outer end portion 110 of the valve stem 90 to tightly grip the knob flange 111 between washers 112 and 113 and thereby fix the knob 104 on the valve stem 90. In this way, rotation of the knob 104 threads it axially along the valve sleeve 72 and axially advances or retracts the valve stem 90 to open or close the corresponding inlet or outlet valve 22 or 23.

The block 20 further includes bleed and test valve bosses 120, 121. The bosses 120 and 121 have end faces 122 and 123 each substantially perpendicular to the length axis of the corresponding boss. As schematically shown in FIG. 4, a bleed valve bore 124 opens centrally of the end face 122 and extends substantially coaxially into the boss 120 and thence into the central portion of the body 20 to intersect the inlet valve bore 64 at a location between the central hole 42 serving the steam trap inlet and the interior end of the inlet valve 22. Similarly, a test valve bore 125 opens centrally of the end face 123 of the boss 121 and extends substantially coaxially into the boss 121 and thence into the central portion of the body 20 to intersect the outlet valve bore 65 at a location between the outlet valve 23 and the eccentric holes 43 serving the steam trap outlet.

The valve bores 124 and 125 preferably are similar to each other and are here similar to the valve bores 64 and 65 above described. A description of bore 125 thus will also serve for bore 124. Thus the bore 125 here includes an outward facing, coaxial relief 130 at the inner end of an increased diameter central recess 131. At the outboard end of the central recess 132, the diameter of the bore 125 increases again to form an increased diameter internally threaded, outer recess 133 whose outermost portion is also threaded, namely at 135. The valve bores 124 and 125 are provided for occupancy by the aforementioned bleed and test valves 24 and 25 (FIGS. 1 and 2).

The block 120, as schematically indicated in FIG. 4, also includes bleed and test ports 140 and 141, respectively, which open downward through the bottom 35 of the block 120 and extend upward therefrom into communication with the corresponding bleed and test valve bores 124 and 125, each at the central recess 131. In the embodiment shown, the ports 140 and 141 each include an outwardly (downwardly) facing enlarged diameter recess 142.

The bleed and test valves 24 and 25 are preferably similar to each other. A description of the bleed valve 24 thus will also suffice for the test valve 25. The particular valve 24 shown in schematic FIG. 4 comprises a tubular guide sleeve 150 externally threaded for threaded fixed reception in the threaded outer recess 133. A portion of the guide sleeve 150 extends outward beyond the end face 122 of the boss 120 and a lock nut threads externally on and locks the guide sleeve in the block 20 and bears on the end face 122.

Much like the valves 22 and 23, the valves 24 and 25 each include, coaxially inboard of the valve sleeve 150, axially outer and inner annular seals 173 and 174 flanking a radially ported flow collar 175 and separated from the outer elongated portion 176 of the valve sleeve 150 by an end ring 177. A lode nut 178 locks the guide sleeve 150 against movement on the block 20.

The valve 24 further includes an elongate valve stem 153 having an outer portion 152 threaded in the central passage 151 of the guide sleeve 150 and a coaxial reduced diameter, cylindrical, inner portion, or valve head 154 longitudinally slidably and sealingly engaging the annular seals 173 and 174 for positively blocking flow from the corresponding inlet valve bore 64 or outlet valve bore 65, through the bleed port 140 or test port 141.

The outer end portion 155 of the valve stem 153 is reduced in diameter and externally threaded for reception in the central opening of a knob 160 (FIGS. 1 and 2). The knob 160 may be similar to (but preferably smaller in diameter than) the above described knobs 104. In the embodiment shown, washers 162 and 163 and a nut 164 fix the knob 160 on the outer end portion 155 of the valve stem 153, like the washers 112 and 113 and nut 114 (FIG. 3) do as to the knob 104 on valve stem 90.

Rotation of the knob 160 in the appropriate direction threadedly advances the knob threads of the guide sleeve 150 and valve stem 153 with respect to the block 120 to seat the valve head 154 in annular seal 174 to close the valve or to back the head 154 out away from the seal 174 and open the valve.

The block 20, in either its FIG. 3 form or FIG. 1 mirror imaged form, is readily manufacturable by casting, preferably investment casting, wherein a mold insert forms the central portion of the inlet port 52 and inlet valve bore 64 and the communicating inlet chamber 70 and a comparable mold insert forms central portions of the outlet port 53 and outlet valve bore 65 and the outlet chamber 71. Thereafter, the inlet and outlet ports 52 and 53 can be finished by machining, particularly drilling and tapping. The valve bores 64 and 65 can be finished and longitudinally extended by drilling. The bleed and test valve bores 124 and 125 can be drilled and tapped and the holes 42, 43 and 44 can be drilled.

The present invention contemplates that in some instances the apparatus may be provided without one or both of the bleed and test valves 24 and 25. Thus, if desired, lower priced versions of the apparatus may be provided with the bores 124, 125, 140, and 141 entirely omitted, for example, where bleed and test capabilities will not be required.

Referring to FIG. 1, the valves 22–25 and their corresponding bosses are angled 3-dimensionally, namely both radially outward of the central portion of the block 20 and forwardly from the front face 30 of the block, in what might be described as a porcupine-like manner. The length axes of the four valves 22–25 thus angle divergently forwardly from the front face 30 of the block 20. As seen from the top or bottom (FIG. 6 or 10) the longitudinal axes of the four bosses 60, 61, 120 and 121, and their corresponding valves 22–25 angle forwardly from the plane of the back face 31 of the block by approximately 30 to 35°. As seen from the front, as in FIG. 5, the bosses 60 and 61 and the longitudinal axes of their valve bores 64 and 65 angle up from the horizontal (as defined by the block bottom 35 or the common central axis of the inlet and outlet bosses 50 and 51, again by about 30 to 35°. Correspondingly, the longitudinal axes of the bleed and test bosses 120 and 121 angle downward from the horizontal by, again, about 30 to 35°. Clearly, these bosses and their corresponding valves are acutely angled either downwardly or upwardly with respect to an imaginary plane extending through the front back and end faces of the block 20 and parallel to the common center line of the inlet and outlet bosses 50 and 51, which imaginary plane is substantially parallel to the top and bottom faces 34 and 35 of the block. As indicated in part by FIG. 6 or FIG. 14, the length axes of the valves and their ports converge toward a zone behind the front face 30 of the block 20. It will thus be seen that FIG. 4 is schematic in the sense of, for purposes of convenient disclosure, showing the axes of the four valves, as well as the four ports, all in the same plane, namely the plane of the page in FIG. 4. FIG. 4 is thus presented as a convenient schematic way to disclose, in one drawing Fig., the flow connections between all the ports and valve bores. However, FIG. 4 does not show, and is not intended to show, the 3-dimensional space occupied by the 3-dimensionally diverging set of four valve bores of the actual device embodying the invention.

Figure 16:
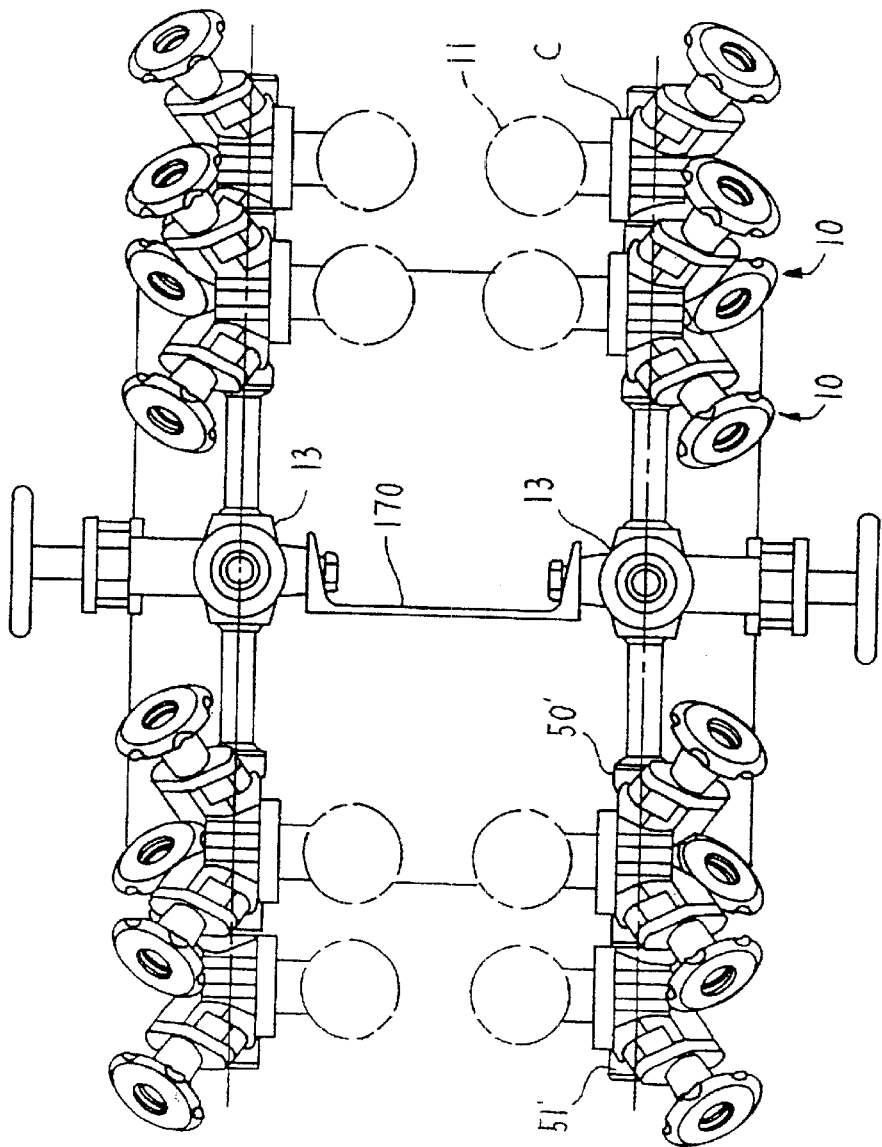
FIG. 16 is a top view of back to back pair of the FIG. 15 manifolds.

This 3-dimensionally forwardly diverging, porcupine-like arrangement of the four valves is particularly advantageous in drain manifold systems (or trees) exemplified at 13 in FIGS. 15 and 16 since it locates the corresponding valve knobs 104 and 160 forwardly spaced from the front face 30 of the corresponding block 20 and thus forwardly of the inlet/outlet piping associated with the manifold 13 and well forwardly of the attached steam trap 11. Thus, the knobs 104 and 160 are in effect located in a cool zone spaced forward of the potentially hot surfaces of the condensate return line and steam trap for less risk of injury to workers manipulating the knobs.

In addition, the divergent forward angling of the valve axes locates all four knobs in a substantially smaller area than would be the case in a monoplanar, pancake-like arrangement of the kind shown in schematic FIG. 3, permitting a higher density of trap stations 10 in a given spacial volume.

In addition, the above described station 10 allows even further reductions in space required by permitting lateral offsetting of stations located on adjacent vertically spaced horizontal pipes of a given manifold system 13 as indicated in FIG. 16.

Even greater packing density of steam traps for units face is achievable by the close location back to back of two planar manifold arrays, here carried on the same upright channel member 170 in FIG. 16.

MODIFICATION

Structural elements, of the embodiment of FIGS. 18–33, that are generally similar to corresponding structural elements of the above described embodiment of FIGS. 1–17 are referenced by the same reference numerals, with the suffix "D" added. The embodiment of FIGS. 18–33 is similar to the above described embodiment of FIGS. 1–17 except as hereafter described.

Figure 24:
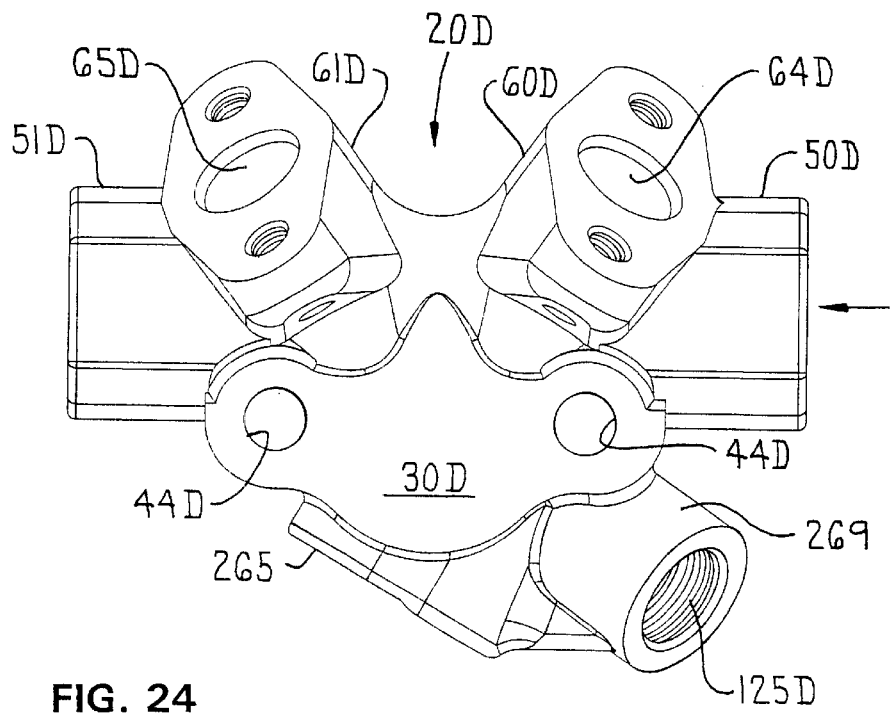
FIG. 24 is an enlarged front view of the FIG. 18 housing.
Figure 26:
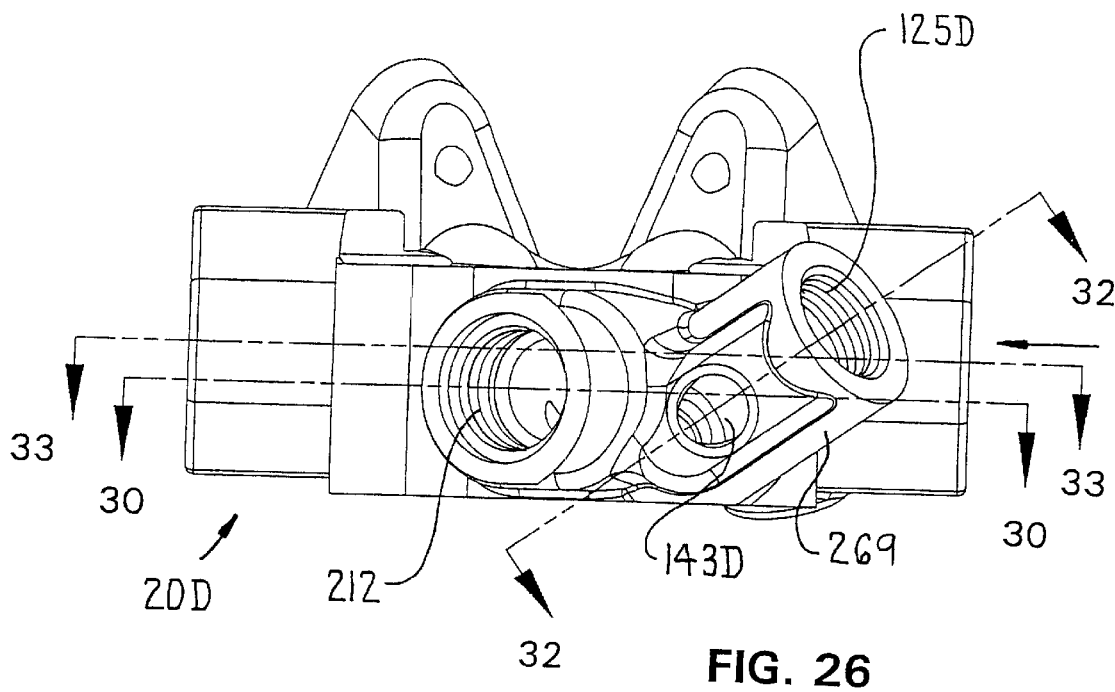
FIG. 26 is a bottom view of the FIG. 24 housing.
Figure 27:
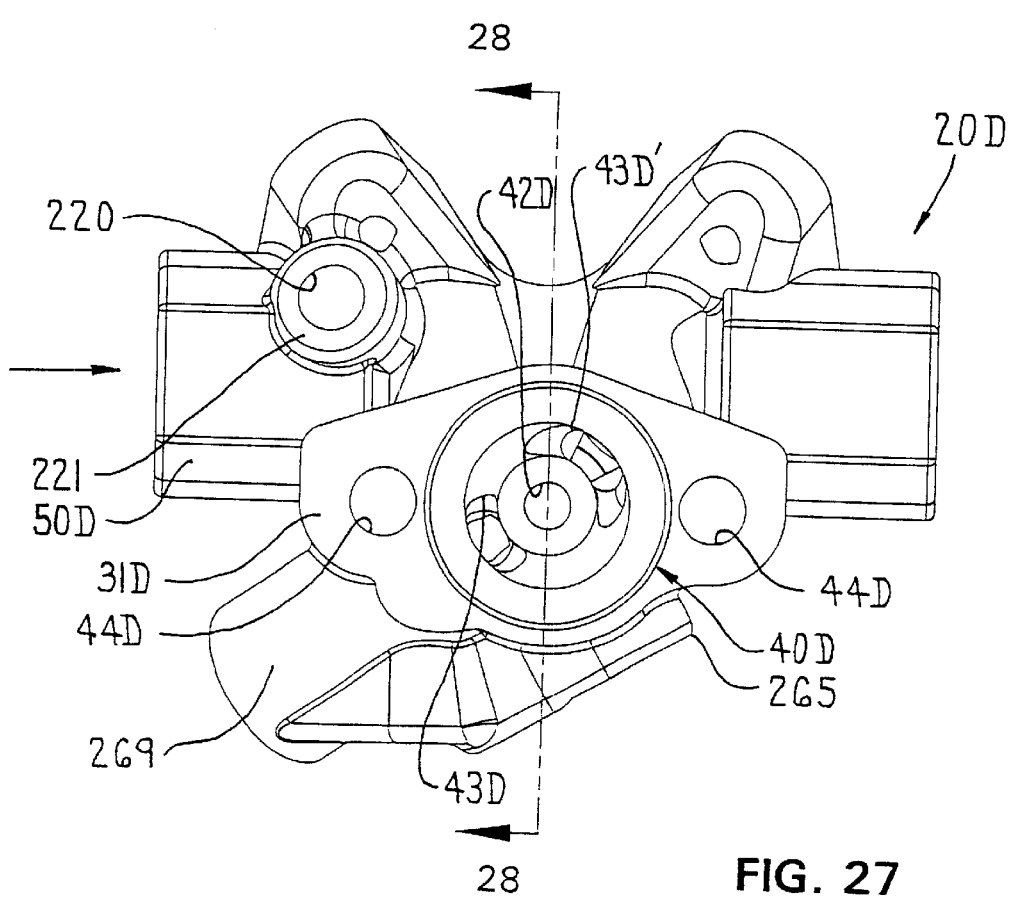
FIG. 27 is a rear view of the FIG. 24 housing.
Figure 28:
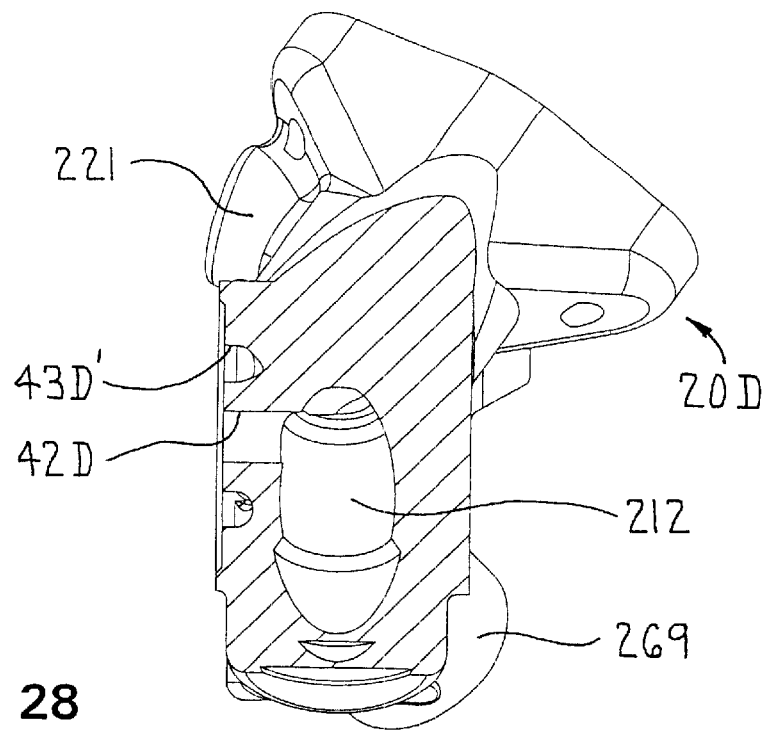
FIG. 28 is a sectional view substantially taken on the line 28—28 of FIG. 27.
Figure 29:
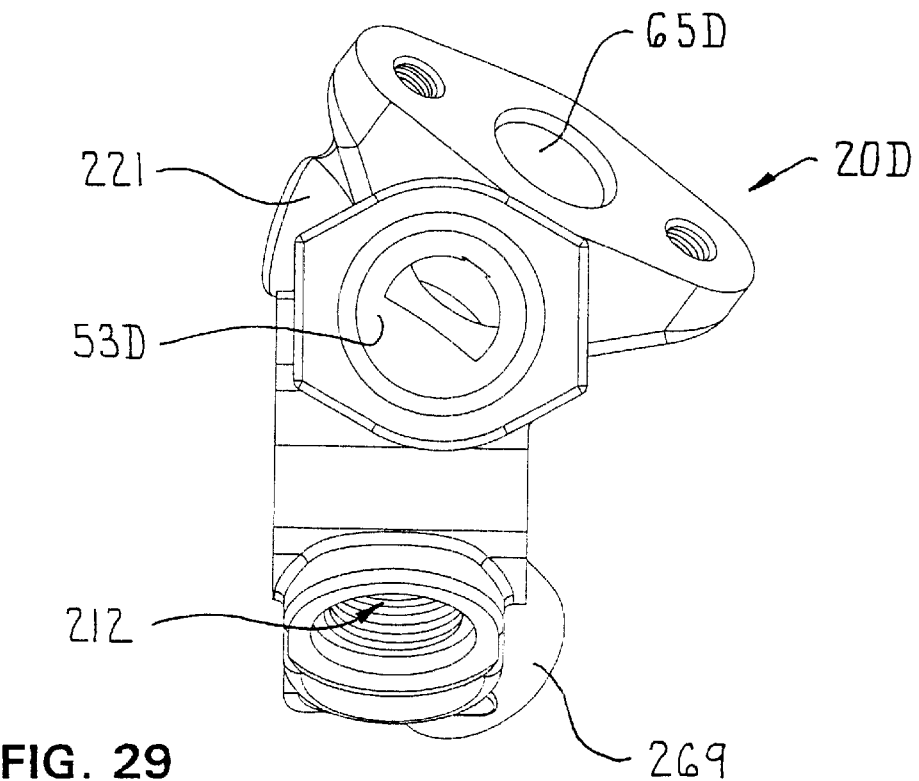
FIG. 29 is an end view of the FIG. 24 housing taken from the outlet (leftward) end thereof.

As seen from the front and rear of the housing block 20D in FIGS. 24 and 27 respectively, the mounting holes 44D are horizontally spaced symmetrically on opposite sides of the fore/aft vertical central plane of the housing block, i.e. the cutting plane 28—28 in FIG. 27. The mounting holes 44D are coplanar with and symmetrically flank the center opening 42D of the mount 40D. The front face 30D (in FIG. 24) of the housing block 20D extends horizontally across the housing block 20D and is located somewhat below the common longitudinal axis of the inlet and outlet bosses 50D and 51D and substantially symmetrically below the inlet and outlet valve bosses 60D and 61D. The mounting holes 44D open through the horizontally spaced end portions of the front face 30D and are overhung by the forwardly angled inlet and outlet valve bosses 60D and 61D. A steam/condensate responsive device e.g. a steam trap (such as the trap 11 of FIG. 17) can be fixed by screws (like the screws 45 of FIG. 17), passing through the mounting holes 44D of the housing block 20D, generally as discussed above as to FIGS. 1–17 except for the horizontal rather than vertical spacing of mounting holes 44D.

The mount 40D (FIG. 27) has a central trap supply opening 42D surrounded by a planar inner annular face 202, an annular groove 203, and a planar outer annular face 204, here coplanar with the face 202. The annular groove 203 of the mount 40D is pierced by eccentric openings 43D and 43D' (FIG. 27) which are here circumferentially elongate, are generally kidney bean shaped, are generally diametrically opposed, and are located respectively below and above the plane of the central axes of the mounting holes 44D, substantially at the 8 o'clock and 2 o'clock position in FIG. 27. The annular faces 202 and 204 seal against corresponding faces on a conventional steam/condensate responsive device, e.g. the trap 11 of FIG. 15, directly or by interposition of a suitable gasket (not shown). Thus, the central opening 41D is sealed against leakage with respect to the openings 43D and 43D'.

The outlet valve 23D (FIG. 21) controls flow from the steam trap eccentric opening 43D' through the inner part of the outlet valve bore 65D, outlet chamber 71D and outlet port 53D. On the other hand, the other eccentric trap outlet flow opening 43D supplies a test valve bore 125D as described hereafter.

The housing block 20D (FIGS. 21 and 22) includes an inlet valve passage 210 which continues through the block 20D and opens through generally opposite surfaces thereof. In the preferred embodiment shown, the inlet valve passage 210 extends generally diagonally through the block 20D from the upper corner adjacent the inlet port 52D to the opposite lower corner of the block, below the outlet valve 23D. The inlet valve passage 210 comprises an upper end portion defining the inlet valve bore 64D, a lower end portion defining a screen chamber 212, and a central portion 214 therebetween.

An inlet bleed opening 220 (FIGS. 22 and 27) opens into the inlet chamber 70D fed by the steam inlet port 52D. The inlet bleed opening 220 (FIG. 27) here lies behind the inlet valve member 90D (FIG. 22) and flow collar 75D. The bleed opening 220 opens rearward through a shallow boss 221 (FIG. 27) on the back face 31D of the housing block 20D, behind the inlet boss 50D. At least the rear portion of the bleed opening 220 is internally threaded for normal closure by a conventional, removably threaded plug 222 (FIG. 22), e.g. one generally similar to the plug 260 hereafter described.

The screen chamber 212 (FIGS. 21 and 30) comprises, sequentially outward from the central portion 214 of the inlet valve bore 64D, an outward (downward) facing, generally cylindrical step 230, an outward facing, beveled annular seat 231, an elongate preferably cylindrical portion 232, an outward facing bevel 233, an internally threaded generally cylindrical portion 234, and an outward opening step 235. The central, trap supply opening 42D perforates the central part of the elongate generally cylindrical portion 232 and extends rearward therefrom through the mount 40D (FIG. 27) on the back face 31D of the housing block 20D.

A screen 240 (FIGS. 19–21) is removably interposed in the inlet valve passage 210 between the inlet valve stem 90D and the trap supply opening 42D, to block possible contaminant particles in steam/condensate flow past the open inlet valve stem 90D from entering a steam trap carried on the rearward facing mount 40D (FIG. 27) of the housing block 20D.

Conveniently, the screen 240 is an elongate hollow member having a perforate peripheral wall. In the preferred embodiment, the screen 240 is substantially in the form of a right circular cylinder. The screen 240 has an open inner end 241 (FIG. 21) which snugly nests in the annular step 230 (FIG. 30) and abuts the outward facing, inner end wall thereof to prevent further inward displacement of the screen along the inlet valve passage 210.

The bevel 231 (FIG. 30) guides the inner end of the screen 240 axially into place against the step 230. The peripheral wall of the elongate generally cylindrical portion 232 is radially spaced outboard of the peripheral wall of the screen 240 to define an annular flow space 242 (FIG. 21) therebetween, which annular flow space opens to said trap supply opening 42D.

An annular fitting 250 (FIG. 20) is shown in somewhat simplified form in FIG. 21. The annular fitting 250 has a central throughbore comprising an outer recess 251, an inward facing guide bevel 252, an inner generally cylindrical recess 253 for snugly and slidably receiving the outer end of the screen 240, an inboard facing beveled seat 254 for seating the outboard end of the screen 240 snugly thereon, and an internally threaded hole 255 opening through the outboard (lower in FIG. 20) end of the fitting 242. The elements 251–254 are preferably coaxially aligned. The outboard (lower in FIG. 20) end of the fitting 242 defines a generally outwardly extending, tool (e.g. wrench) engagable head 256 (FIGS. 19 and 20) surrounding a portion of the internally threaded hole 254. The annular fitting 250 has an externally threaded peripheral surface 257 extending inboard (upward in FIG. 20) from the head 256. A conventional plug 260 has an outboard, tool engagable head 261 and an inboard extending, generally cylindrical externally threaded shank 262. The head 261 may, for example, be socketed for engagement by an insertable (e.g. Allen) wrench or, as shown, enlarged and faceted for external engagement by an open end or socket wrench, as desired.

To close the outboard end of the fitting 250, the threaded shank 262 of the plug 260 is threaded into the threaded hole 255 of the fitting 250 to sealingly close the hole 255. In the embodiment shown, the threaded shank 262 and hole 255 may be conventionally compatably tapered, so that tight threading of the plug 260 in the hole 255 seals the latter.

A seal ring 264, for example a flat, washer-like, metal ring, is sized to slide axially over the externally threaded portion 257 of the fitting 250 and axially abut the head 256.

The screen 240 may be installed in the housing block 20D as generally indicated in FIGS. 19, 20, 21 and 30. The screen 240 is seated against the seat 254 in the fitting 250. The seal ring 264 can then be sleeved over the externally threaded shank portion 257 of the fitting 250 and the plug 260 can be threaded into the threaded hole 255 of the fitting 250 and tightened sufficient to close same. Thereafter, the resulting assembly 240, 250, 260 is inserted, screen 240 first, into the screen chamber 212. The fitting 250 by engagement of its threads 257 with the surrounding threads 234 of the screen chamber 212, is threaded into the screen chamber 212 until the inboard end of the screen 240 snugly enters into the shallow cylindrical step area 230 at least near to the outboard facing, inner end thereof, with the head 256 of the fitting 250 pressing firmly the seal ring 264 against the opposed surface of the housing block 20D. In the embodiment shown, such contact is with the end of a shallow boss 265 integrally projecting from the central portion of the housing block 20D. Thus, the fitting 250 and screen 240 are located substantially at one bottom corner (the leftward corner in FIG. 21) of the housing block 20D, and diagonally of the housing block from the valve stem 90D.

FIG. 21 schematically shows the outlet valve bore 65D and test valve bore 125D extending in substantially opposite directions (namely toward the upper left and lower right respectively in FIG. 21) from the trap mount condensate forwarding openings 43D' and 43D, respectively. Thus, as seen from the front, the outlet valve bore 65D and test valve bore 125D extend substantially diagonally across the block 20D, with their inboard ends separated by the width of the central portion of the mount 40D (FIG. 27). The outboard end of the test valve bore 125D opens through the outboard end of a boss 269 protruding at the lower right (in FIG. 21) of the housing block 20D. While the outlet valve bore 65D and test valve bore 125D are schematically represented as being in the plane of the page in FIG. 21, it will be apparent, for example from FIGS. 24 and 26, that both angle forwardly with respect to the plane of the trap mount 40D (FIG. 27) and hence with respect to the back face 31D of the block 20D.

Proceeding in a direction outward of the housing block 20D the test valve bore 125D (FIG. 32) includes an outward facing, annular, beveled seat 270, an elongate generally cylindrical guide portion 271, an outward facing annular bevel 272 and a generally cylindrical, internally threaded portion 273.

A test port 141D takes the form of a simple, internally threaded hole extending up from the bottom of the housing block 20D and intersecting the cylindrical portion 271 of the test valve bore 125D just outboard of the seat 270.

A test valve 280 (FIGS. 19 and 21) has an elongate stem 281 which (from its inboard end to its outboard end) comprises a convex inboard end 282, an elongate generally cylindrical shank 283 which carries an annular groove 284 near its outboard end, an enlarged diameter, externally threaded portion 285 and a tool (e.g. wrench) engagable head 286.

An annular collar 290 (FIGS. 19 and 21) has an internally threaded throughbore 291, an externally threaded, inboard extending portion 292, and an outboard end in the form of a radially outward extending tool (e.g. wrench) engagable head 293. The test valve 280 further includes a retainer ring 294 (e.g. a springy, metal split ring).

Figure 32:
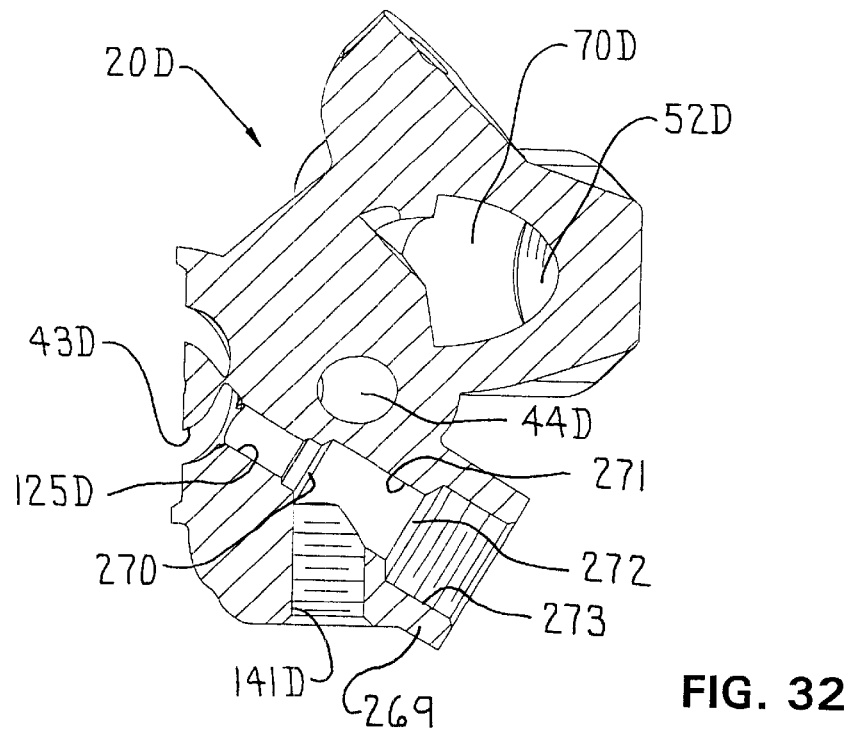
FIG. 32 is a sectional view taken substantially on the line 32—32 of FIG. 26.
Figure 33:
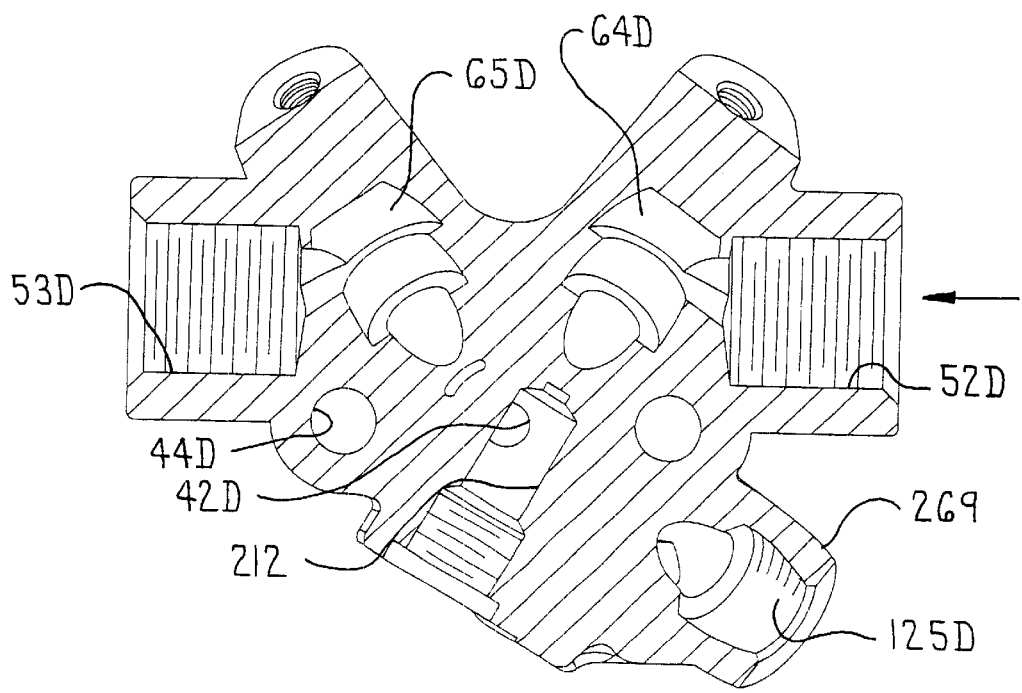
FIG. 33 is a sectional view substantially taken on the line 33—33 of FIG. 26.

The test valve 280 (FIGS. 19, 21 and 32) is assembled by threading the shank 281 into the collar 293, locating the retaining ring 294 in the shank groove 284 inboard of the inner end of the collar 290, and threading the collar 290 into the internally threaded, outboard portion 273 of the test valve bore 125D. The elements are sized such that, with the collar head 293 bearing on the outboard end of the test valve boss 269 of the block 20D, the convex inboard end 282 of the valve stem 281 bears sealingly against the seat 270 (FIG. 32) and the retaining ring 284 is located in its most inboard position near (but not against) the bevel 272 (FIG. 32). Thus, by unthreading the stem 281 with respect to the collar 290, the convex stem end 282 is backed away from the seat 270. This opens the test valve 280 to allow fluid flow from the condensate forwarding opening 43D out the test port 141D. Unthreading of the stem 281 with respect to the collar 290, and hence opening of the test valve 280, is limited in extent by bottoming of the retaining ring 294 against an inboard facing bevel 295 at the inboard end of the collar 290.

If desired, an outlet tube (not shown) may be provided at the outboard end of the test port 141D, to convey away trap outlet fluid released by opening of the test valve 280. To this end, the test port 121D is internally threaded to receive a conventional fitting (not shown) on such an outlet tube.

Turning now to the operation of the station 10D of FIGS. 18–33, the inlet port 52D is connected to a steam/condensate supply line and the condensate outlet port 53D is connected to a condensate return line, substantially in the manner discussed above with respect to the embodiments of FIGS. 1–17. With the inlet and outlet valves 22D and 23D initially closed, incoming steam/condensate enters the inlet port 52D, the flow being indicated by corresponding arrows in FIG. 21.

Connecting the inlet port 52D to a steam/condensate line, or prior work on the steam line upstream of the housing block 20D, may result in contaminant particles e.g. bits of metal in the steam inlet port 52D. To avoid entry of such contaminant particles into a steam trap on the back of the housing block 20D (which contaminant particles potentially could interfere with the operation of the steam trap), the steam inlet bleed opening 220 may be temporarily opened, by removal of its plug 222, to vent incoming steam/condensate from the inlet port 52D through the inlet chamber 70D and bleed opening 220 and out the back face of the housing block 20D. When the incoming steam/condensate flow appears to be free of contaminant particles, the bleed opening 220 can again be closed by insertion of its plug 222. It is desired to turn off the steam supply upstream of the inlet port 52D while removing and reinstalling the plug 222.

If desired, the plug 222 can be substituted by a conventional bleed tube (not shown) having a valve (not shown)

openable for conveying steam/condensate and entrained contaminants to some desired location away from the housing block 20D.

The inlet valve 22D is preferably kept closed during bleeding of contaminants through the bleed opening 220, to positively prevent any of such contaminants from reaching the trap supply opening 42D, and thus avoid interference with trap operation.

During normal operation of the station 10D (FIG. 21), the inlet valve 22D and outlet valve 23D are open. Thus, as indicated by the solid line arrows, steam/condensate passes through the inlet port 52D, passes the inboard end of the open valve stem 90D, enters the open inner end of the screen 240, and flows radially outward through the peripheral wall of the screen 240 and through the trap supply hole 42D into a trap fixed to the back of the housing block 20D. In normal operation, the trap periodically outputs condensate forwardly through the condensate forwarding hole 43D' in the housing block 20D, which condensate passes the inboard end of the valve stem 90D of the outlet valve 23D and thence out the outlet port 53D.

Particles in the incoming steam/condensate are prevented by the screen 240 (FIG. 21) from entering the trap supply opening 42D and thus tend to collect over time within the hollow cylindrical screen 240. When desired, passage of fluid through the housing block 20D can be interrupted by closing the inlet and outlet valves 22D and 23D, namely by moving their respective valve stems 90D inboard substantially to their closed position shown for example in FIG. 22. In this condition, any particles that have collected within the hollow screen 240 can, by removing the plug 260 from the fitting 250, fall by gravity from the screen 240. If desired, the inlet valve 22D can be briefly partially opened to steam flush, and thus help move collected particles, out the open bottom. Thereafter, with the inlet valve 22D closed, the plug 260 can be replaced in the fitting 250 and the station 10D is ready to resume operation with a clean screen 240. Note that such screen cleaning has taken place without need to remove the screen 240 from the housing block 20D.

However, if at some time it is desired to remove the screen 240, e.g. for inspection, same can be done as follows. The inlet and outlet valve 22D and 23D are closed and the fitting 250 (within its closure plug 260) is unthreaded from the housing block 20D, thereby freeing the screen 240 from the block. With the screen inspected, or removed and replaced with respect to the fitting 250, the fitting 250 is threaded back into the housing block 20D, to seal the bottom end of the screen 240 with respect to the bottom of the housing block 20D.

It will be seen that the above described use of the steam inlet bleed opening 220 and screen 240 can substantially extend the time of trouble free trap operation, with attendant reduction in cost for labor and replacement trap parts or traps as a whole.

Figure 30:
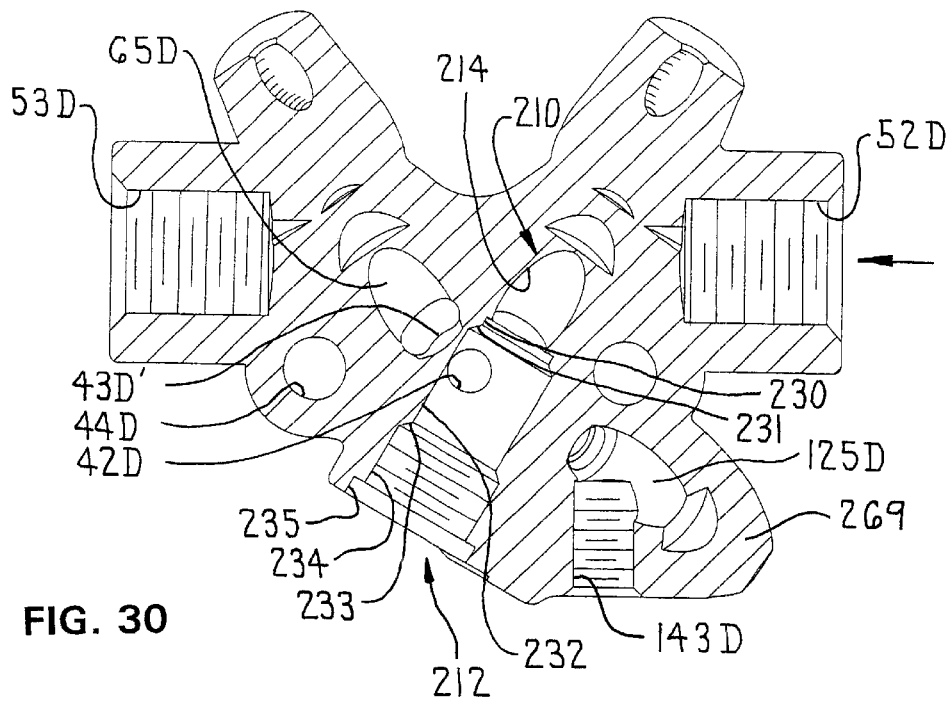
FIG. 30 is a sectional view substantially taken on the line 30—30 of FIG. 26.
Figure 31:
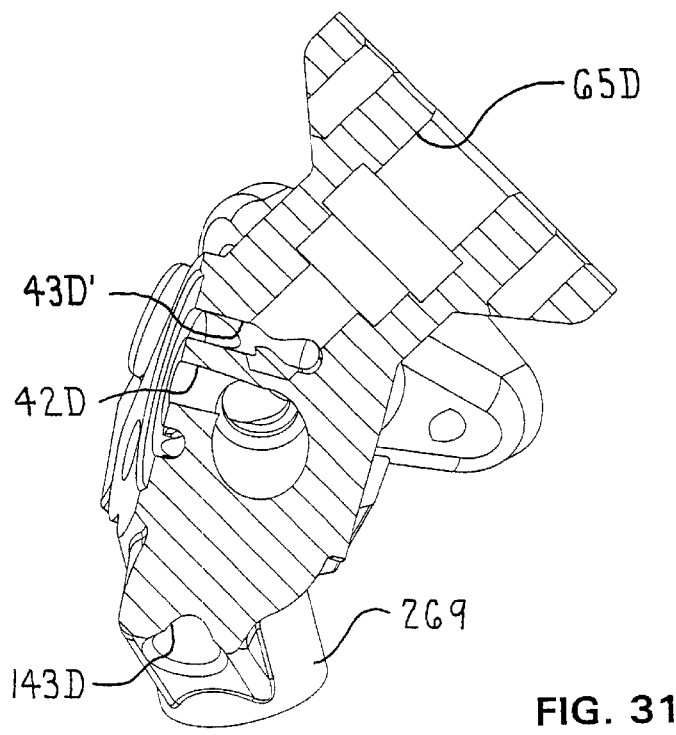
FIG. 31 is a sectional view substantially taken on the line 31—31 of FIG. 25.

Should it be desired to investigate the operating condition of a trap by inspecting its output, same can be done as follows. With the outlet valve 23D (FIG. 21) closed, the test valve can be opened by unthreading the elongate valve stem 281 with respect to the annular collar 290, until the retainer ring 294 hits the inboard end of the annular collar 290. This positions the convex inboard end 282 of the stem 281 off and outboard away from the seat 231 (FIG. 30). This allows condensate outputted from the trap to flow from the lower condensate forwarding hole 43D through the test valve 125D, past the inboard end 282 of the open test valve 280, and downwardly and out through the test port 141D in the bottom of the housing block 20D, in the manner indicated by the broken line arrows in FIG. 21.

The retaining ring 284 prevents inadvertent complete unthreading and removal of the valve stem 281 from the collar 290 and hence from the housing block 20D. This prevents steam from escaping through the collar 290 to hit and injure the person unthreading the valve stem 281, and avoids possible inadvertent loss thereof.

The station 10D is thereafter restored to normal operation by reversing the steps above mentioned, namely by closing the test valve 280 and opening the station outlet valve 23D.

FIGS. 34–38 show a further modification wherein the FIG. 21 fitting 250 and plug 260 are substituted by a screen clean out valve unit 300.

Parts of the FIGS. 34–38 modification similar to parts of the embodiments described above will carry the same reference numerals with the suffix F added.

Figure 20:
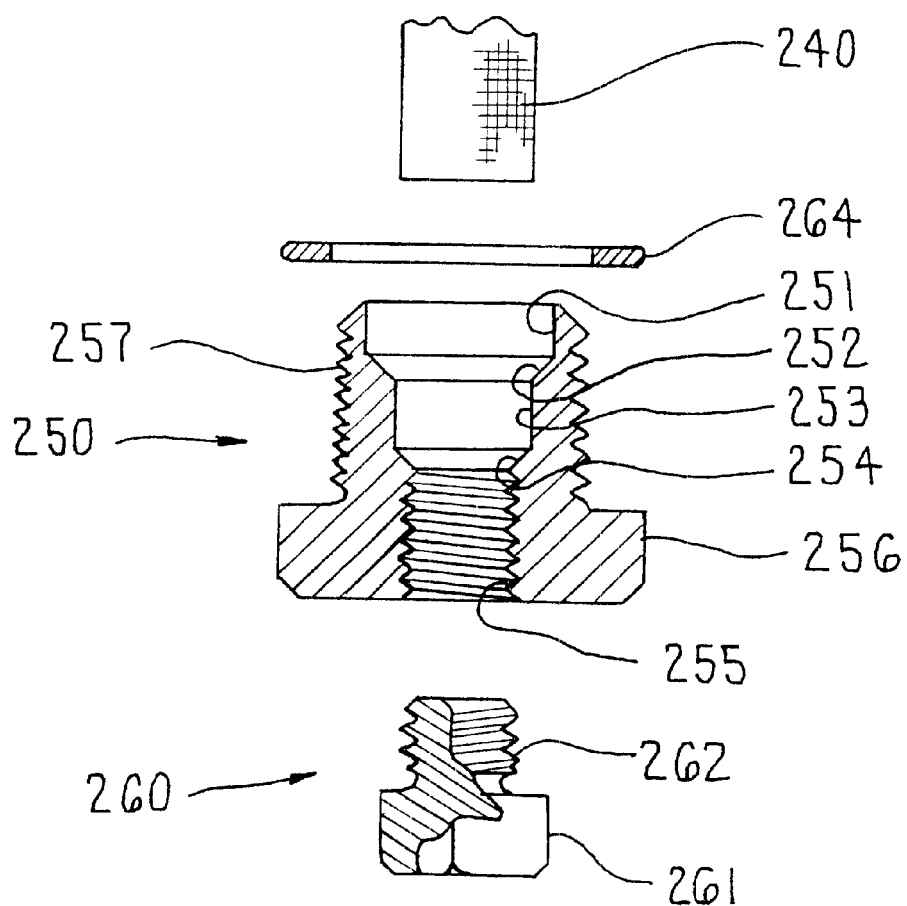
FIG. 20 is an enlarged exploded view of the FIG. 19 screen unit.
Figure 23:
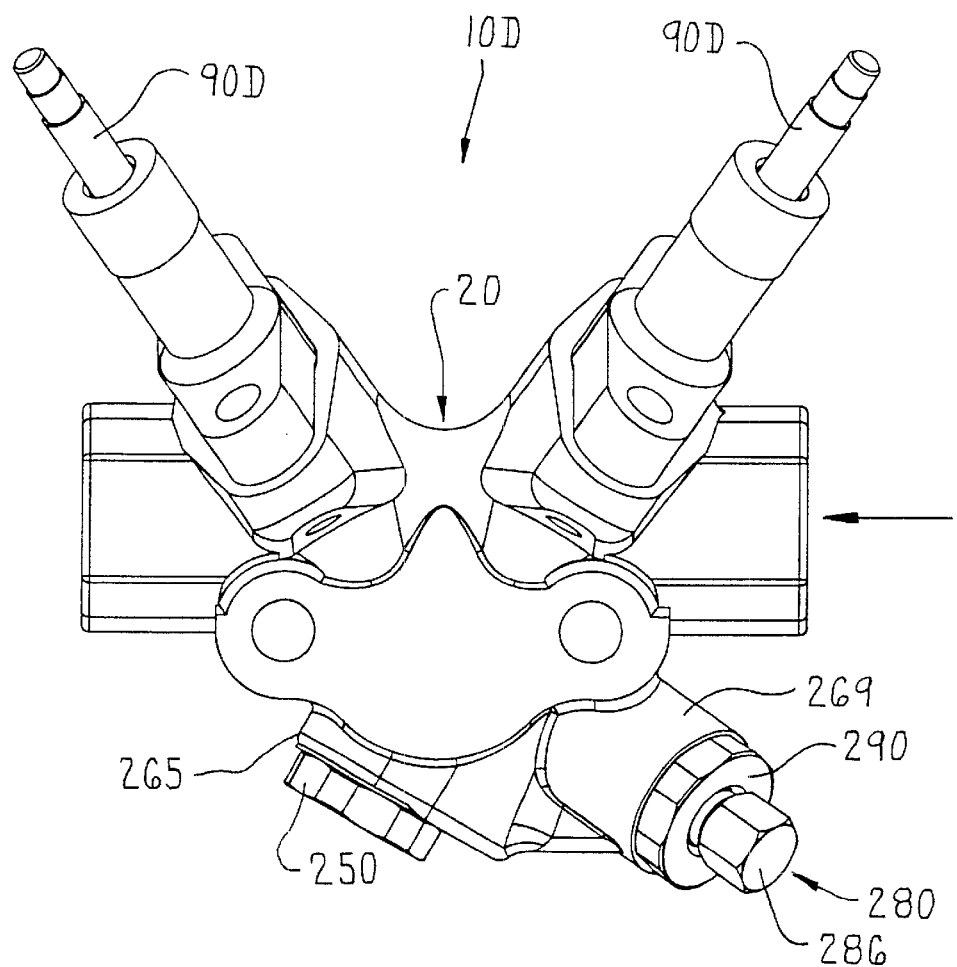
FIG. 23 is an enlarged view of the FIG. 18 device with the inlet and outlet valve knobs and securement screws omitted.
Figure 25:
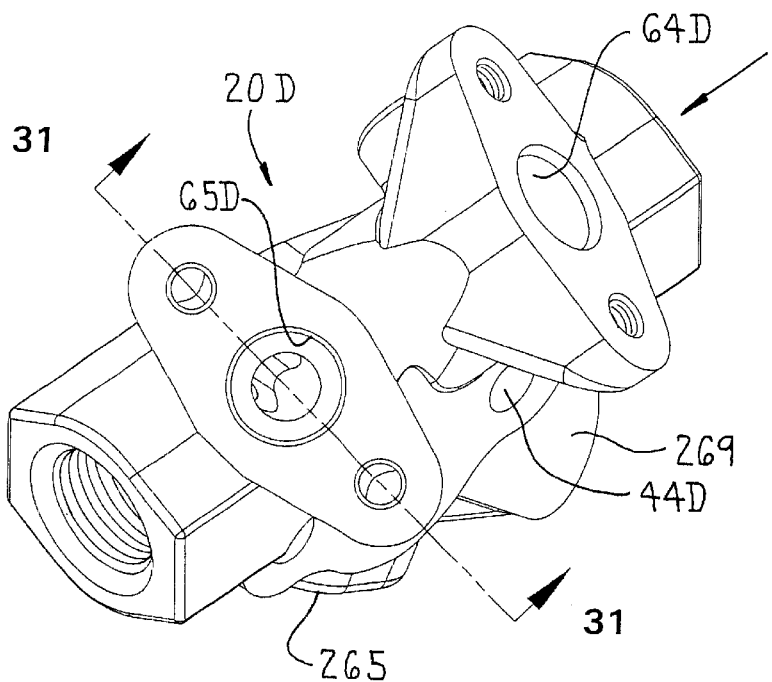
FIG. 25 is a pictorial view of the FIG. 24 housing taken from the top, left, front quadrant thereof.

Thus, the screen clean out valve unit 300 (FIG. 38) includes an annular fitting 250F generally similar to the fitting 250 of FIG. 20 except as follows. The fitting 250F, inboard of the inner generally cylindrical recess 253F, has an outward (upward in FIG. 38) facing step 301 overlying a reduced diameter central bore 302, in turn overlying a downwardly diverging annular beveled seat 303, in turn overlying a downward opening internally threaded recess 255F. Generally as above described with respect to FIG. 20, the screen 240F of FIG. 38 enters the cylindrical recess 253F and, in the embodiment shown in FIG. 38, seats on the step 301. An annular collar 310, here generally similar to the annular collar 290 above described, is dimensioned to thread its externally threaded inboard extension portion 292F into the threaded hole 255F of the annular fitting 250F.

A screen blow out valve 311 (FIG. 38) may be of any desired configuration but here is generally similar to the test valve 280, except as noted below. More particularly, the elongate stem 281F of the screen blow out valve 311 has an inboard end beveled at 312 in correspondence to the annular beveled seat 303. The elongate valve stem 281F further includes a transverse, preferably diametrical, bore 313 near the inboard (upper in FIG. 38) end thereof. The stem 281F further includes an axial outlet bore 314 which communicates with the transverse bore 313 and extends coaxially therefrom and outwardly (downwardly in FIG. 38) to open through the head 286F of the stem 281F.

As with the above described test valve 280, the particular screen clean out valve unit 300 here shown is assembled by threading the externally threaded portion 285F of the elongate stem 281F fully into the internally threaded through bore 291F of the annular collar 310, to seat the head 286F on the outboard end of the head 293F.

In the embodiment shown, the inboard (upward in FIG. 38) end of the internally threaded through bore 291F has a large inboard facing bevel 316. With the stem 281F fully threaded into the collar 310, the annular groove 284F of the stem is exposed beyond the inboard end of the collar 310, enabling the retaining ring 294F to be installed in the groove 284F. The stem 281F can then be unthreaded outward with respect to the collar 310 until the retaining ring 294F bottoms against the annular bevel 316. With the annular collar 310 and screen blow out valve 311 thus assembled, same can be installed on the annular fitting 250F by threadedly engaging the external and internal threads 292F and 255F and screwing the annular collar 310 fully and tightly into the outboard end of the annular fitting 250F. The fitting 250F threads into the housing block 20D in the manner discussed above with respect to the fitting 250 of FIG. 21.

The parts are sized such that the stem 281F sufficiently unthreaded with respect to the collar 310 that the retaining ring 294F bottoms in the annular bevel 316, the beveled inboard end 312 of the stem 281F is spaced from the seat 303, thus allowing fluid and particles from the screen 240F to pass outboard along the central bore 302 and annular beveled seat 303 and into the inboard portion of the threaded hole 255F. The generally threaded portion 292F of the annular collar is considerably shorter than an outer recess 255F, so as to allow material flowing from the inside of the screen 240F to pass radially into the transverse bore 313 in the stem 281F and then axially outward along the axial outlet board 314 thereof to exit from the outboard end of the stem 281F, thereby flowing and releasing contaminants from the inside of the screen 240F without need to separate any structural element from the housing block 20D.

To stop such flow at the bottom of the screen 240F, the outboard stem 281F is threaded inboard lengthwise of the collar 310 until its beveled end 312 abuts and seals against the seat 303 and restore the condition of the screen clean out valve unit 300 shown in FIGS. 36 and 37.

Figure 34:
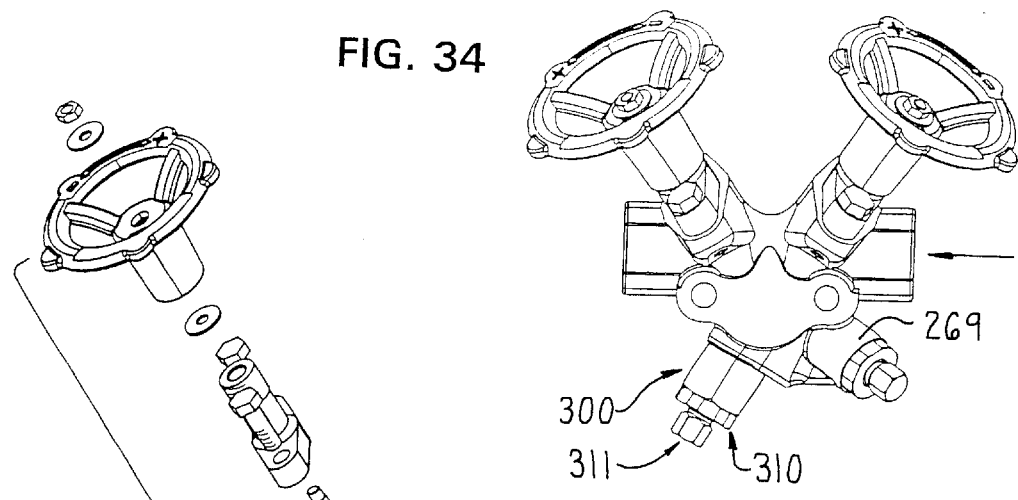
FIG. 34 is a view similar to FIG. 18 but showing a further modification.
Figure 35:
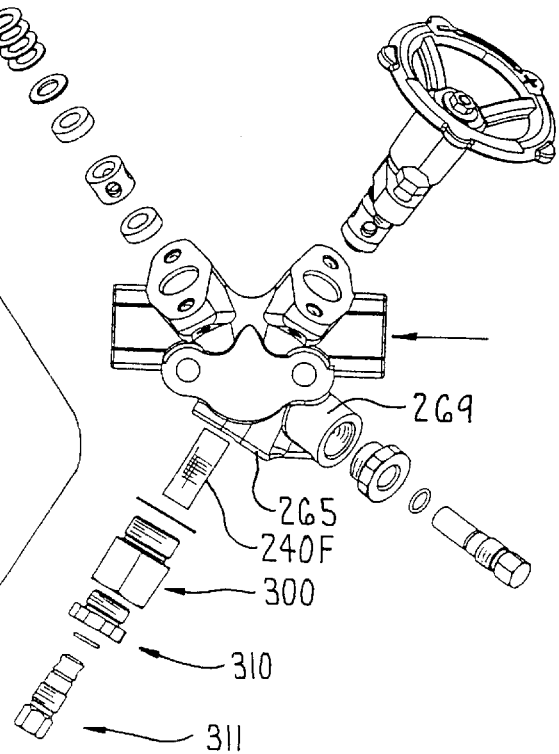
FIG. 35 is a view similar to FIG. 19 but disclosing a further modification.
Figure 38:
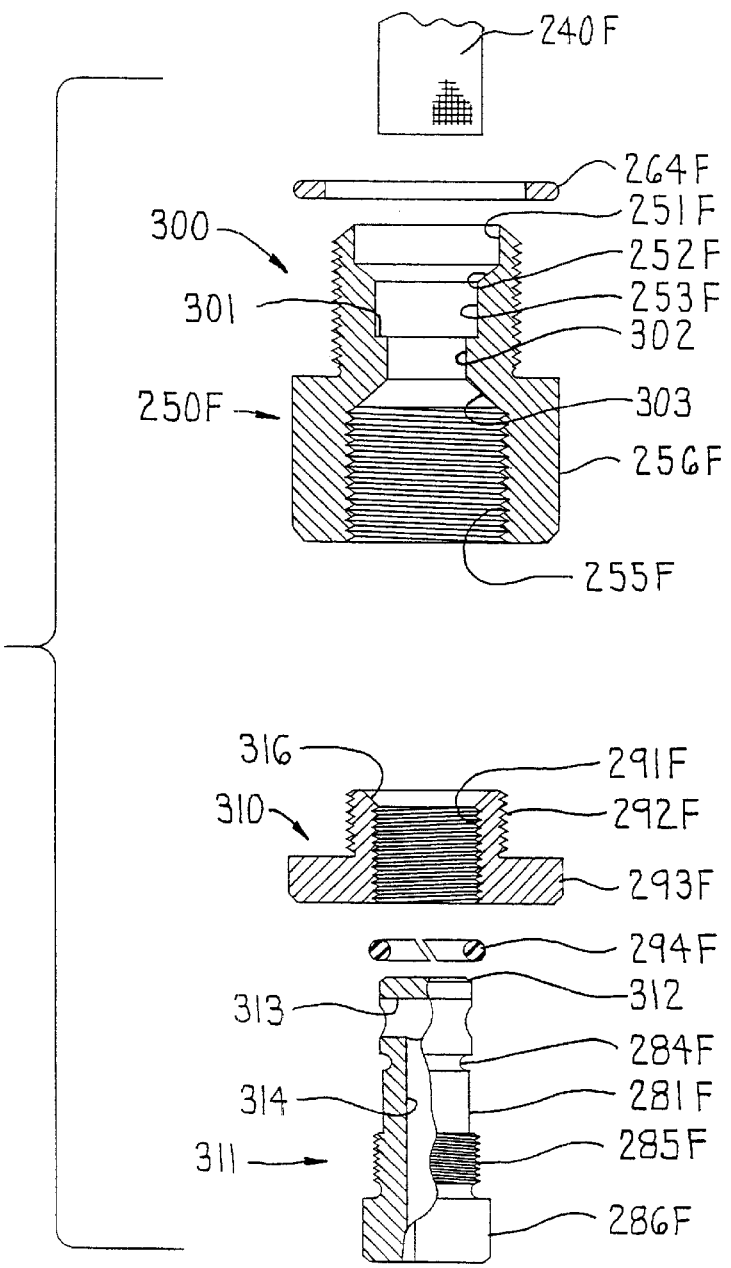
FIG. 38 is an exploded schematic version of FIG. 37.

Although the FIGS. 1, 18 and 34 embodiments are constructed for right to left flow therethrough, it will be understood that mirror imaged versions of these devices may be provided when left to right flow is desired.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A station for mounting a steam/condensate responsive device in a condensate return line, comprising:
    a housing block having a rear facing mount for removably mounting a steam/condensate responsive device, said block having oppositely end facing steam inlet and condensate outlet ports for connection to the condensate return line, said mount having a trap supply opening, a screen in said block between said steam inlet port and said trap supply opening, said block having an inlet valve passage continued through the said block and opening through generally opposite surfaces of said block;
    an elongate inlet valve received in one end portion of said inlet valve passage, said screen being received in an opposite end portion of said inlet valve passage.

2. The apparatus of claim 1 in which said screen in hollow and has an end open to a central part of said valve passage inboard of said inlet valve, said hollow screen having an interior which in an open position of said inlet valve is in a steam flow path from said steam inlet port.

3. The apparatus of claim 1 in which said trap supply opening of said trap mount communicates with the outside of said hollow screen.

4. The apparatus of claim 3 in which said screen is a right circular cylinder, said opposite end portion of said inlet valve passage including a screen chamber of diameter greater than said screen and providing an annular flow space around said screen, said trap supply opening being open to said annular space, so as to provide a steam path from said steam inlet port axially into said hollow screen, radially outward through the peripheral wall of said hollow screen, through said annular space and into said trap supply opening.

5. The apparatus of claim 1 including a fitting removably fixed to said block at said other end portion of said valve passage and retaining the screen therein.

6. The apparatus of claim 5 in which said inlet valve passage other end portion has an outward opening recess, said fitting comprising an annular member threaded into said recess, said annular member having a through bore including a recess defining an inward facing seat receiving the outer end of said screen, a plug threaded in the outer end of said annular member through bore and removably closing same.

7. The apparatus of claim 5 in which said inlet valve passage other end portion has an outward opening recess, said fitting comprising an annular member threaded into said recess, said annular member having a through bore including a recess defining an inward facing seat receiving the outer end of said screen, said annular member through bore having an outward facing recess defining an outward facing seat, a further annular member threaded in said outer end of said first mentioned annular member, a valve stem threaded into said further annular member and having an inner end portion extending into said outward facing recess, said valve stem having a closed position abutting said outward facing seat and an open position spaced outward from said outward facing seat.

8. The apparatus of claim 7 in which said valve stem has a blind axial bore opening through its outer end and a transverse bore near its inner end and communicating with said inner end portion of said blind axial bore and with said outward facing recess.

9. The apparatus of claim 8 in which said valve stem has an annular groove inboard of said further annular member and a retaining ring in said groove and limiting axial travel of said valve stem between said open and closed positions.

10. The apparatus of claim 5 including a valve member removably fixed with respect to said block adjacent the outer end of said screen and having a first position closing the outer end of said screen to force steam flow through said screen to said trap supply opening, and a second position opening at the outer end of said screen to remove from said screen contaminant particles collected from steam entering said steam inlet port.

11. A station for mounting a steam/condensate responsive device in a condensate return line, comprising:
    a housing block having a rear facing mount for removably mounting a steam/condensate responsive device, said block having a steam inlet port and oppositely facing condensate outlet port for connection in a condensate return line, said block having a trap condensate forwarding zone, a test valve bore and an outlet valve bore, said outlet valve bore communicating with said condensate outlet port, said trap condensate forwarding zone being interposed between said test valve bore and outlet valve bore, said test valve bore and outlet valve bore extending in substantially opposite directions from said condensate forwarding zone.

12. The apparatus of claim 11 in which at least one of said test valve bore and outlet valve bore angle forward from a central portion of said block.

13. The apparatus of claim 11 in which said test valve bore and outlet valve bore extend away from each other substantially diagonally across said block.

14. The apparatus of claim 13 including an inlet valve passage extending substantially diagonally across said block in front of the inboard ends of said test valve bore and outlet valve bore.

15. The apparatus of claim 14 in which said test valve bore and outlet valve bore inboard ends communicate with respective trap condensate forwarding openings which open rearward of said block, said inlet valve passage central portion communicating with a trap steam supply opening located between said spaced trap condensate forwarding openings.

16. The apparatus of claim 14 in which said test valve bore and outlet valve bore angle forwardly on said block.

17. The apparatus of claim 11 including a test port in said block and intersecting said test valve bore, a test valve including an elongate test valve stem threadedly adjustably mounted in said test valve bore, said test valve bore having a step open to said test valve bore and an inner portion of said test port, said elongate test valve stem having a convex inner end having a closed position sealed against said step and an open position spaced from said step.

18. The apparatus of claim 17 in which said test valve stem in captive with respect to said block such that its displacement is limited to positions between said closed and open positions.

19. The apparatus of claim 18 in which said test valve includes an annular collar threaded into a recess in the outer end of said test valve bore, said test valve stem being threaded into said annular collar, said test valve stem having an annular groove inboard of said annular collar, a retainer ring in said groove and axially interfering with said annular collar at said open position to bar withdrawal of said test valve stem from said test valve bore.

20. A station for mounting a steam/condensate responsive device in a condensate return line, comprising:
a housing block having a front, a back, opposite ends, a top and a bottom, said back having a mount for removably mounting a steam/condensate responsive device, said ends respectively having inlet and outlet ports for connection in a condensate return line, said bottom having a third port, an inlet valve and outlet valve operatively interposed between and controlling flow between said mount and corresponding ones of said inlet and outlet ports, and a third valve operatively interposed between and controlling flow between said third port and one of said inlet and outlet ports, said valves being angled divergently forwardly from said block and with respect to each other, said third valve angling forward and downward from said housing block, said inlet and outlet valves angling forward and upward from said housing block.

21. The apparatus of claim 20 in which said third valve is acutely angled downward and inlet and outlet valves are acutely angled upward with respect to an imaginary plane extending through said front, back and ends of said block, said imaginary plane being substantially parallel to said top and bottom of said block and substantially parallel to the length axes of said inlet and outlet ports.

22. The apparatus of claim 21 including a fourth valve angled divergently forwardly from said block front and with respect to said inlet and outlet and third valves, said fourth valve angling forward and downward from said housing block.

23. The apparatus of claim 22 including third and fourth ports in said bottom of said block and connected respectively with said third and fourth valves.

24. The apparatus of claim 20 in which said housing block includes a central portion defining said top, bottom, front, back, and ends, said housing block also including plural, individual, elongate bosses integral with and protruding stalk-like from ends of said block central portion and spaced from each other, said bosses having outboard ends spaced from said central portion.

25. A compact multi-station manifold assembly for mounting plural steam/condensate responsive devices in a steam system, comprising:

a manifold including an elongate, tubular condensate return header connectable in a steam system for steam/condensate flow therein, said manifold further including plural lateral fluid connections at spaced locations on said header;

stations for mounting respective steam/condensate responsive devices at respective fluid connections on said header, a given said station comprising a block having an outlet port connectable to the corresponding said header fluid connection and an inlet port connectable to a steam line of a steam system, said stations extending substantially radially from said header to connect to corresponding steam lines, said station having valves angled accurately to an imaginary plane defined by the forward/rearward and sideward axes of said block.

26. The apparatus of claim 25 in which said fluid connections comprise tubular arms extending from said header, said header being upstanding, said arms on one side of said header being of different length for laterally staggering stations, and thus valves and steam/condensate devices thereof, located above one another to minimize the space required by said manifold assembly.

27. The apparatus of claim 25 including a second similar manifold mounted and spaced back to back relation with said first mentioned manifold, the back faces of said stations on said first and second manifolds facing each other in spaced relation and carrying respective steam/condensate responsive devices in the space between said manifolds.

28. The apparatus of claim 25 in which said header is upstanding, said arms on said one side of said header being of the same length for locating stations thereon in vertically aligned relation, with valves on a vertically spaced pair of said stations framing an opening through which a steam/condensate responsive device can be grasped by service personnel, said top and bottom faces of said blocks being free of valves to allow close vertical spacing of said stations.

29. A station for mounting a steam/condensate responsive device in a condensate return line, comprising:
a housing block having a front, a back, opposite ends, a top and bottom, said back having a mount for removably mounting a steam/condensate responsive device, said ends having inlet and outlet ports for connection in a condensate return line, said bottom having a third port, an inlet valve and outlet valve operatively interposed between and controlling flow between said mount and corresponding ones of said inlet and outlet ports, said inlet and outlet valves being located on and extending forward from said front face, said inlet and outlet valves being angled acutely upwardly along said front.

30. The apparatus of claim 29 in which said bottom has a third and fourth ports, third and fourth valves operatively interposed between and controlling flow between said third and fourth ports and respective ones of said inlet and outlet ports, said third and fourth valves being located on said front, all four valves being mutually angled divergently forwardly from said front face in a 3-dimensional, generally porcupine-like manner.

31. A steam system including a station for mounting a steam/condensate responsive device in a condensate return line, said station comprising:
a housing block having a front, a back, opposite ends, a top and a bottom, said back having a mount for removably mounting a steam/condensate responsive device, said ends respectively having inlet and outlet ports for connection in a condensate return line, an inlet valve and an outlet valve operatively interposed between and controlling flow between said mount and corresponding ones of said inlet and outlet ports, said housing block including a compact central portion defining said top, bottom, front, back and ends, said housing block also including individual, plural, elongate bosses integral with and protruding stalk-like from ends of said block central portion and spaced from each other, said bosses having outboard ends spaced from said central portion.

32. The apparatus of claim 31 in which two said bosses protrude in opposite directions, substantially coaxially from opposite ends of said block central portion, and define inlet and outlet bosses, said inlet and outlet ports being in the outboard ends of said inlet and outlet bosses, respectively, and thus remote from the periphery of said housing block central portion.

33. The apparatus of claim 32 in which three said bosses protrude forwardly and divergently from said block central portion and define respective inlet valve and outlet valve and third valve bosses, from outboard ends of which further protrude stems of said inlet and outlet valves and of a third valve, respectively.

34. The apparatus of claim 33 including a fourth said boss protruding forwardly and from said block central portion and diverging from said inlet valve boss and said outlet valve boss and said third valve boss, said fourth valve boss having outboard end from which protrudes the stem of a fourth valve.

35. The apparatus of claim 34 in which, as seen from the front, the outboard ends of the inlet valve boss and the outlet valve boss extend higher than the top of the housing block central portion and the third and fourth valve bosses generally underlie respective ones of said inlet valve and outlet valve bosses and diverge downwardly therefrom.

36. The apparatus of claim 32 in which said inlet valve boss and outlet valve boss each have a generally oval shaped outboard end, said inlet and outlet valves having generally oval mounting flanges sized and shaped like, and fixed to, the corresponding boss ends by releasable fasteners.

37. The apparatus of claim 30 in which the longitudinal axes of said four valves diverge forward from the housing block substantially like side edges of a four-sided pyramid.

38. The apparatus of claim 30 in which said four valves have respective longitudinal axes, the axes of said inlet and outlet valves defining and diverging in a first plane, said third and fourth valves defining and diverging in a second plane, said first and second planes converging rearward and meeting in said housing block on a line at least adjacent and parallel to the common central axis of said inlet and outlet ports.

39. A station for mounting a steam/condensate responsive device in a condensate return line, comprising:

a housing block having front and back faces spaced to define the thickness of said block, said back face having a steam/condensate responsive device mount, said front face being spaced forward from said mount, said block having opposite ends and inlet and outlet ports opening through said opposite ends;

parallel screw receiving through-holes extending thicknesswise through said block from said mount and having length axes defining a plane projecting through said mount and front face;

elongate inlet and outlet valves angling from said block, said inlet valve having a length axis angled acutely to said plane of said screw receiving through-holes;

fluid passages in said block communicating said valves and mount for controlling flow in said passages but isolated from said screw receiving through-holes.

40. The apparatus of claim 39 in which said block has a top extending in an imaginary plane parallel to length axes of said inlet and outlet ports and to said length axes of said screw receiving through-holes, said outlet valve having a length axis acutely angled to said imaginary plane.

41. A station for mounting a steam/condensate responsive device in a condensate return line, comprising:

a housing block having a mount for removably mounting a steam/condensate responsive device, said mount having a trap supply opening, said block having a steam inlet port for connection in a condensate return line, an inlet valve operatively interposed between and controlling flow between said steam inlet port and trap supply opening, a steam inlet bleed opening, a steam path between said steam inlet port and said inlet valve and connected to said steam inlet bleed opening, said block having exterior faces, said steam responsive device mount being on a first said block exterior face which is spaced from said inlet port and inlet valve, and through which said first face opens said trap supply opening and steam inlet bleed opening in mutually adjacent relation.

42. The apparatus of claim 41 in which said block has an inlet valve passage along which the said inlet valve extends and having ends opening through opposite second and third block exterior faces which are transverse to said first block exterior face, a screen extending along said inlet valve passage past said trap supply opening, said screen having an outboard end adjacent said third block exterior face and an inboard end extended substantially toward said steam inlet bleed opening.

43. The apparatus of claim 41 in which said trap supply opening transversely intersects said inlet valve passage at a point spaced between said inlet valve passage ends, said trap supply opening and steam inlet bleed opening being open generally in the same direction from said block.

44. The apparatus of claim 1 in which the said opposite end portion has an open end, said screen being sized to insert through said open end into said opposite end portion of said inlet valve passage.

* * * * *